US005483049A

United States Patent [19]
Schulze, Jr.

[11] Patent Number: 5,483,049
[45] Date of Patent: Jan. 9, 1996

[54] COUPON EXCHANGING AND CHECK WRITING SYSTEM

[75] Inventor: Everett E. Schulze, Jr., Aurora, Colo.

[73] Assignee: In-Store Media Systems, Inc., Aurora, Colo.

[21] Appl. No.: 192,639

[22] Filed: Feb. 7, 1994

[51] Int. Cl.⁶ .................................................. G06K 15/00
[52] U.S. Cl. .................................... 235/383; 364/401
[58] Field of Search .................................. 364/401, 402; 235/383

[56] References Cited

U.S. PATENT DOCUMENTS

| | | | |
|---|---|---|---|
| 4,540,880 | 9/1985 | Hipko | 235/487 |
| 4,554,446 | 11/1985 | Murphy et al. | 235/487 |
| 4,634,147 | 1/1987 | McClure | 283/56 |
| 4,723,212 | 2/1988 | Mindrum et al. | 364/401 |
| 4,896,791 | 1/1990 | Smith | 221/7 |
| 4,949,256 | 8/1990 | Humble | 364/401 |
| 5,008,519 | 4/1991 | Cunningham et al. | 235/487 |
| 5,128,520 | 7/1992 | Rando et al. | 235/375 |
| 5,173,851 | 12/1992 | Off et al. | 364/410 |
| 5,185,695 | 2/1993 | Pruchnicki | 364/401 |
| 5,208,445 | 5/1993 | Nahar et al. | 235/383 |

Primary Examiner—F. L. Evans
Attorney, Agent, or Firm—Sheridan Ross & McIntosh

[57] ABSTRACT

An electronic coupon exchange system is disclosed whereby the exchange system both generates and redeems coupons. Upon entering a retail sales store, consumers can exchange conventional coupons for exchange system coupons which are only applicable to the retail sales store entered. The exchange system invalidates a conventional coupon and prints an exchange system coupon for a product promoted by the coupon exchange system. Consumers are enticed to use the exchange system coupons since the coupons can be redeemed for cash via checks printed immediately upon redemption of the coupons or by having an account credited. Consumers are also enticed to use the new coupons by games and bonus prizes associated with the exchange system coupons. The exchange system redeems exchange system coupons without the use of retailer funds. Thus, retailers obtain full price for products purchased with the exchange system coupons. Data stored by the exchange system for printing an exchange system coupon can be modified remotely at substantially any time. Thus, exchange system coupons can be modified as needed to target consumers patronizing a particular retail sales store by offering exchange coupons having sufficient discounts or other enticements to motivate consumers into using the exchange system coupons.

37 Claims, 23 Drawing Sheets

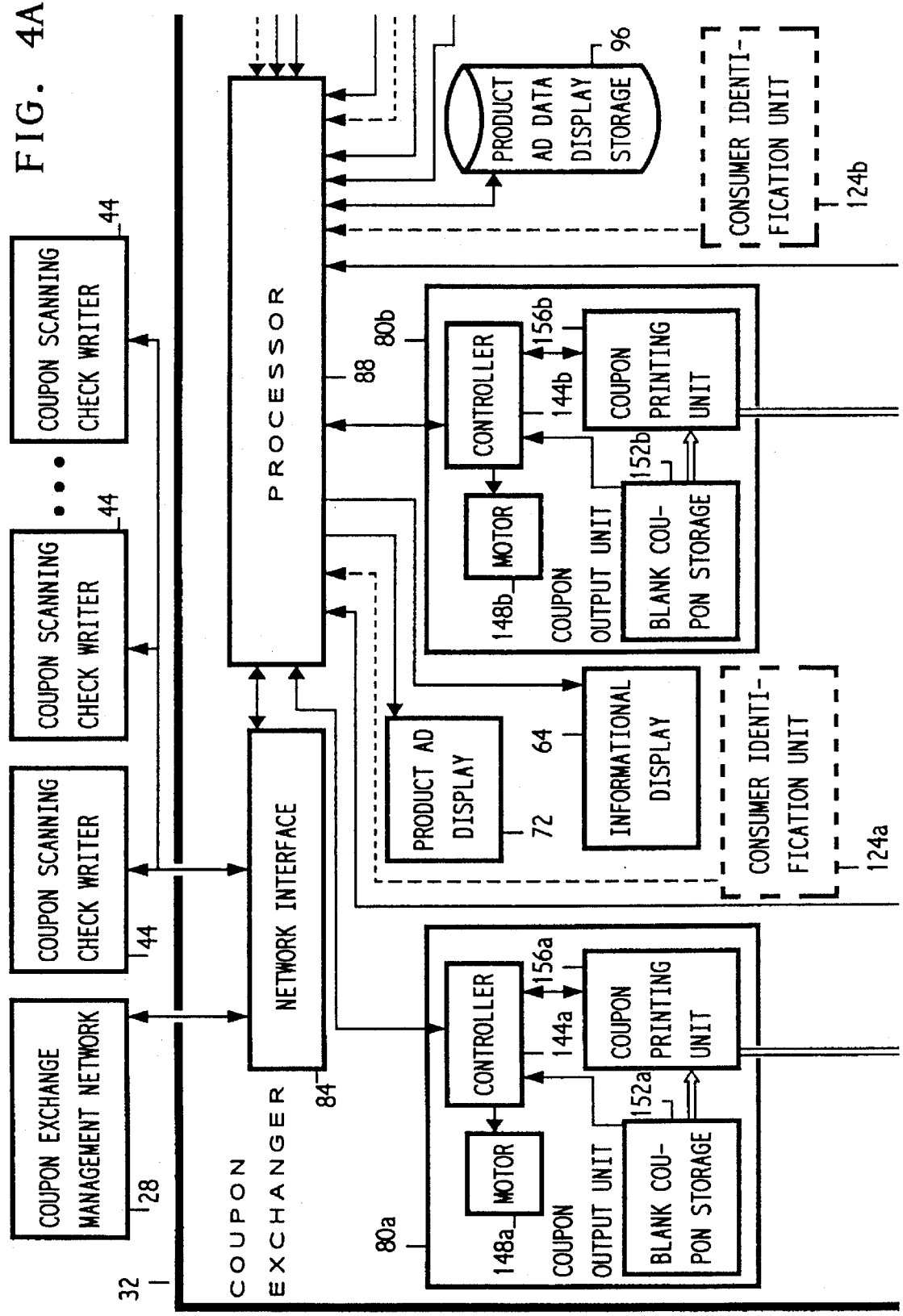

```
┌─────────────────────────────────────────────────┐
│ SEND TO THE COUPON EXCHANGE 32:                 │
│ (i) ANY CONSUMER IDENTIFICATION DATA;           │
│ (ii) THE TOTAL VALUE OF THE COUPONS REDEEMED;   │──820
│ (iii) THE AMOUNT OF ANY BONUS POINTS ALLOTED    │
│       TO THE CONSUMER;                          │
│ (iv) DATA REGARDING THE VALUE OF THE COUPON     │
│      EXCHANGE COUPONS 40 REDEEMED PER PRODUCT;  │
│ (v) THE NUMBER OF COUPON EXCHANGE COUPONS 40    │
│     REDEEMED PER PRODUCT;                       │
│ (vi) THE AMOUNT OF ANY BONUS CHECK WRITTEN;     │
└─────────────────────────────────────────────────┘
                         │
┌─────────────────────────────────────────────────┐
│ RESET THE ACCUMULATION FIELDS OF THE REDEEMED   │
│ COUPON DATA STORAGE 220 AND THE CONSUMER        │──824
│ TRANSACTION DATA STORAGE 228 IN PREPARATION     │
│ FOR THE NEXT CONSUMER                           │
└─────────────────────────────────────────────────┘
                         │
                      ( DONE )
```

FIG. 11B

COUPON EXCHANGING AND CHECK WRITING SYSTEM

FIELD OF THE INVENTION

The present invention relates to a system for facilitating the generation, redemption and exchange of coupons whereby the invention is useful as an intermediary between coupon distributors, retailers and consumers.

BACKGROUND OF THE INVENTION

Coupons have become an integral strategy for advertising and marketing products to consumers. Unfortunately, the number of coupons redeemed is exceedingly small; e.g., for coupons distributed via newspapers and magazines, the percentage of redeemed coupons is estimated to be about 2.4%. Further, there are substantial problems with regard to the distribution and redemption of coupons for both the distributors of coupons and the retailers who are required to redeem coupons.

From a coupon distributor's perspective, the following problems are encountered:

(1.1) Due, at least in part, to the large number of unused coupons, there is substantial opportunity for fraud wherein unused coupons are presented to the coupon distributor for reimbursement;

(1.2) The cost per redeemed coupon is high. This is due in part to the low redemption percentage, but also due to coupon handling charges by, for example, retailers and coupon clearing houses;

(1.3) It is difficult to target coupons to specific consumers. For example, coupons in newspapers and magazines are generally distributed to all subscribers;

(1.4) Coupon distribution is not conveniently related to product purchases. That is, coupons are likely to be received by the consumer at almost any other time than when they would be most beneficial, which is immediately before the choice of a product for purchase.

From a retailer's perspective, the following problems are encountered:

(2.1) There can be a substantial delay between the acceptance of coupons for redemption and when the retailer is compensated for the coupons accepted. Thus, the retailer experiences a constraint on cash flow;

(2.2) There is a cost overhead in handling redeemed coupons incurred by the retailer. For example, redeemed coupons must be collected, bundled and sent to coupon clearing houses.

From a consumer's perspective there is, in general, insufficient motivation to use coupons since the time and effort required for perusing advertisements to extract desired coupons and subsequently coordinating purchases with the extracted coupons is beyond what most consumers will do.

Thus, it would be advantageous if the above difficulties could be addressed with a single coupon generation and redemption system. Toward this end, the coupon system of the present invention addresses the above difficulties, as will be described below.

SUMMARY OF THE INVENTION

The present invention is a novel method and apparatus for managing coupons which addresses the above-mentioned difficulties of coupon distributors, retailers and consumers. The coupon redemption system of the present invention is useful in performing an intermediary role between coupon distributors, retailers and consumers. That is, the present invention generates coupons, collects marketing data for coupon distributors, redeems coupons presented to the retailers without using retailer funds, reduces retailer coupon handling overhead and provides substantial incentives for consumers to use the coupons generated by the present invention.

The present invention, hereinafter known as a coupon exchange system, allows consumers to exchange conventional coupons (such as those obtained via newspapers and magazines) for coupons generated by the present invention. Such coupon exchange system generated coupons, denoted hereinafter coupon exchange coupons, when presented for redemption, may be redeemed for the cash value of the coupons. More precisely, for all coupon exchange coupons accepted by the coupon exchange system for redemption during a consumer purchasing transaction, the coupon exchange system can, in one embodiment, print a check for the total cash value of the accepted coupon exchange coupons or, in an alternative embodiment, credit a consumer's account for the amount. In either embodiment, however, it is an important aspect of the present invention that the funds used for redemption of the coupon exchange coupons are not those of the retailer. Thus, the retailer obtains full price for each product purchased with coupons exchange coupons.

In regards to exchanging conventional coupons for coupon exchange coupons, the coupon exchange system of the present invention allows a consumer to exchange virtually any conventional coupon for a coupon exchange coupon, the coupon exchange coupon being printed by the coupon exchange system subsequent to the presentation of the conventional coupon. Note, however, the coupon exchange coupons issued are applicable only (and exactly) for the products promoted by the coupon exchange system. Thus, an advantage for coupon distributors whose products are promoted by the present invention is that coupons for competitor products not promoted by the coupon exchange system are less likely to be used than the coupons of the coupon distributors printed by the coupon exchange system. Moreover, note that since the coupon exchange system is located in a retail sales store, the exchanging of coupons by a consumer is preferably done immediately after the consumer enters the retail sales store, which is of course an extremely opportune time, i.e., just before the consumer selects products for purchase. Further, in regards to the exchanging of coupons, it is an aspect of the present invention to collect and destroy the conventional coupons that have been exchanged for coupon exchange coupons, thereby eliminating the possibility of fraud relating to the exchanged conventional coupons.

It is a further aspect of the present invention to reduce the cost of redeeming coupons in that, upon redeeming coupon exchange coupons, these coupons are automatically invalidated and collected as verification of redemption. Thus, manual handling of redeemed coupon exchange coupons is reduced over conventional coupons.

It is also an aspect of the present invention to allow coupon distributors to modify coupon exchange coupons for their products on a retail sales store basis. That is, a coupon distributor can, from a remote site, electronically communicate with a coupon exchange system within a retail sales store and modify the stored data used by the coupon exchange system in printing coupon exchange coupons such that subsequent coupon exchange coupons are printed using the modified data. Thus, since in the preferred embodiment, the coupon exchange coupons are only valid at the retail sales store in which they are issued, a coupon distributor is able to target consumers that patronize a particular store with coupons sufficiently valuable to entice consumers to use the coupon exchange coupons related to the products promoted by the distributor.

Further, in a related aspect of the present invention, consumers can be enticed to exchange conventional coupons for coupon exchange coupons by the use of games and/or bonus prizes. In particular, the coupon exchange coupons can include games using, for example, rub-off coatings on predetermined portions of the coupons and, in addition, bonus prizes (e.g., cash prizes) can be awarded for the redemption of coupon exchange coupons.

Other features and benefits of the present invention will become apparent from the detailed description and the accompanying figures contained hereinafter.

BRIEF DESCRIPTION OF THE DRAWINGS

FIG. 2 is also a block diagram of an alternative embodiment of the coupon exchange system 20 of the present invention illustrating data flows between a plurality of coupon exchanger units 32 and 32a;

DETAILED DESCRIPTION

Figure 1A:
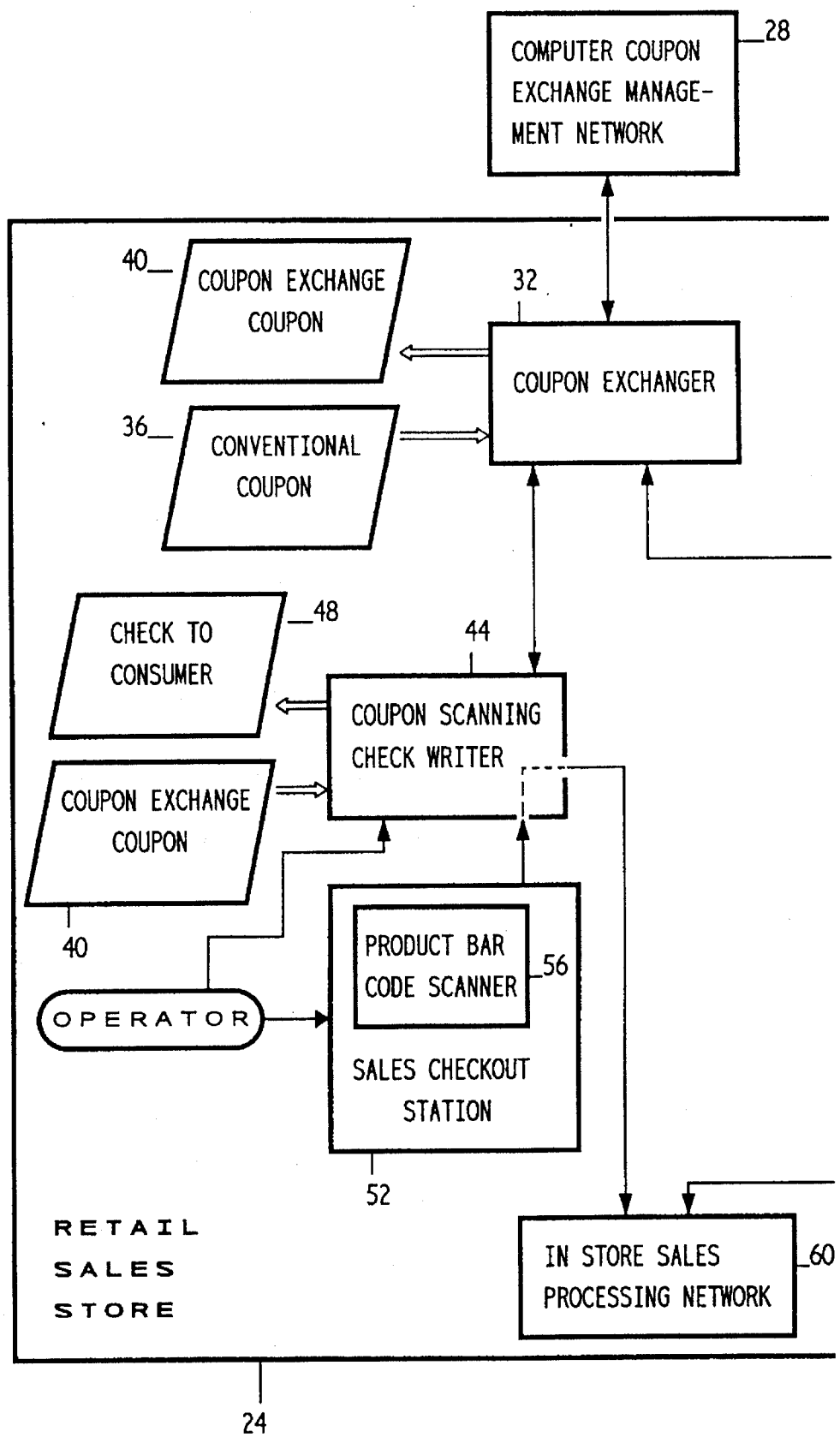
FIG. 1 is a block diagram representing the coupon exchange system 20 of the present invention in a retail sales store 24.
Figure 1B:
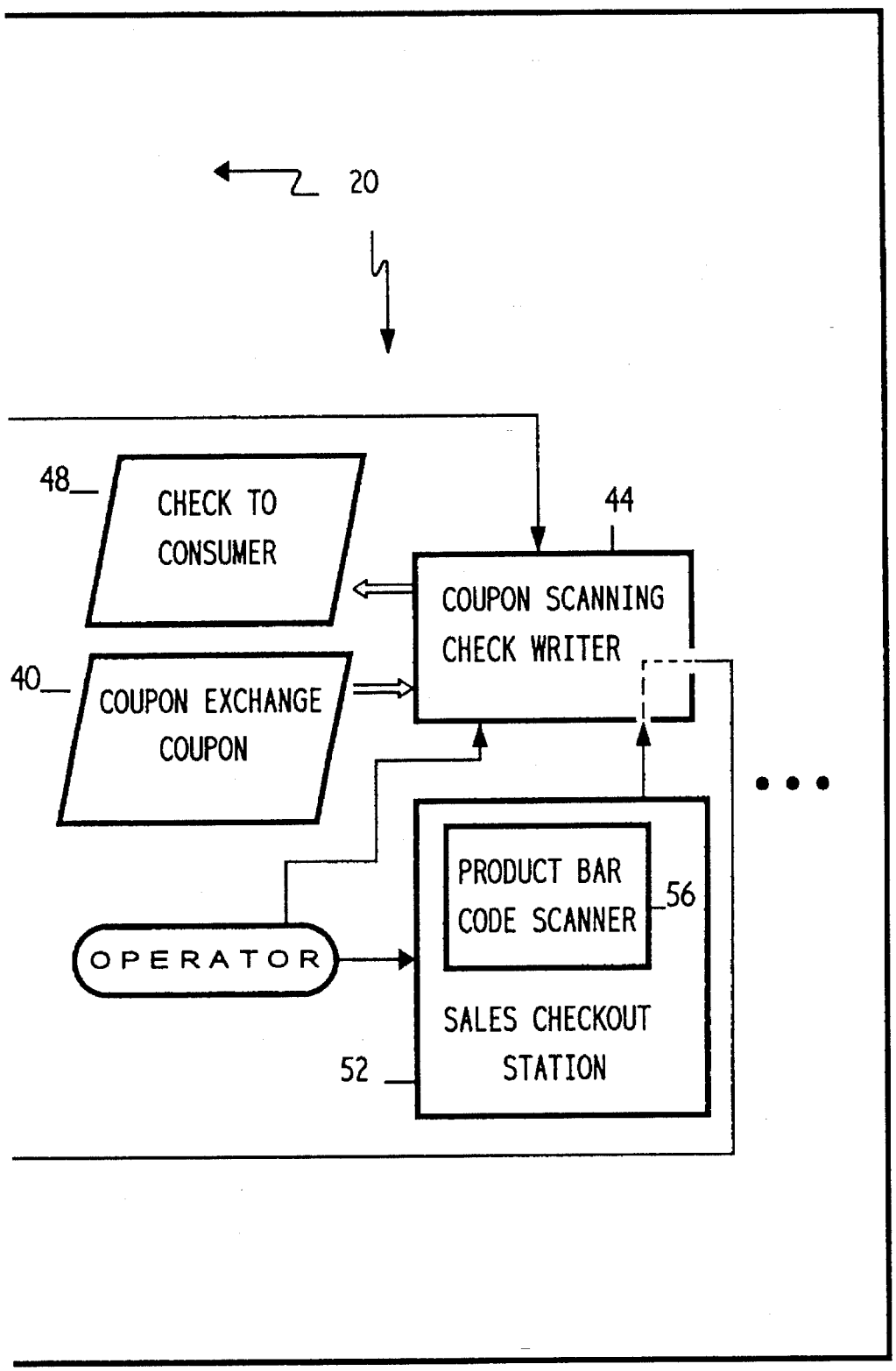

In reference to FIG. 1, the coupon exchange system 20 of the present invention is illustrated in a block diagram in the context of a retail sales store 24 and a computer coupon exchange management network 28. As illustrated, the coupon exchange system 20 includes a coupon exchanger 32 for receiving a conventional coupon 36 (e.g., as would be provided with a newspaper or magazine) and exchanging the coupon for a coupon exchange coupon 40. Additionally, the coupon exchange system 20 also includes one or more coupon scanning check writers 44 used for redeeming coupon exchange coupons 40 for checks 48 which are printed and presented to the consumer as redemption for the coupon exchange coupons 40.

Referring now to the coupon exchanger 32, it is connected to each coupon scanning check writer 44 such that the coupon exchanger 32 can download data regarding, for instance, the coupon exchange coupons acceptable for redemption. In addition, the coupon exchanger 32 receives, for example, data from each coupon scanning check writer 44 regarding the coupons that have been redeemed and the cash value of the redemptions. The coupon exchanger 32 is also connected to a computer coupon exchange management network 28 such that the coupon exchanger 32 can receive data related to, for instance, coupon exchange coupons 40 to be printed as well as data regarding bonuses and cash prizes to be awarded to consumers using coupon exchange coupons 40. Alternatively, the coupon exchanger 32 transfers data to the computer coupon exchange management network 28 related to the coupon exchange coupons 40 that have been redeemed in the retail store 24 and consumer bonuses issued.

Referring now to the coupon scanning check writers 44, note that each such check writer receives data from a related sales checkout station 52. The data received from the sales checkout station 52 is derived from the reading of bar code labelings on products presented for purchase at the sales checkout station. The bar codes of the products are scanned by a product bar code scanner 56 within each sales checkout station 52. Data relating to the scanned bar codes is transferred to the in store sales processing network 60 via the coupon scanning check writer 44. The coupon scanning check writer 44 monitors the bar code data for bar codes of products for which a coupon exchange coupon 40 may apply if presented for redemption. An operator at each sales checkout station 52 operates both the sales checkout station 52 and the coupon scanning check writer 44. In particular, the operator provides input to the coupon scanning check writer 44 by inserting coupon exchange coupons 40 presented by a consumer during a transaction for the purchase of products. In addition, the operator may also be required to input a signal to the coupon scanning check writer 44 as to when all products for a given consumer's transaction have been scanned and a check 48 is to be written corresponding to the total amount on the coupon exchange coupons 40 redeemed during the transaction. Further, one or more additional checks 48 may be written if it is determined that the consumer is a winner of a bonus check or other games associated with the use of coupon exchange coupons 40.

Figure 2:
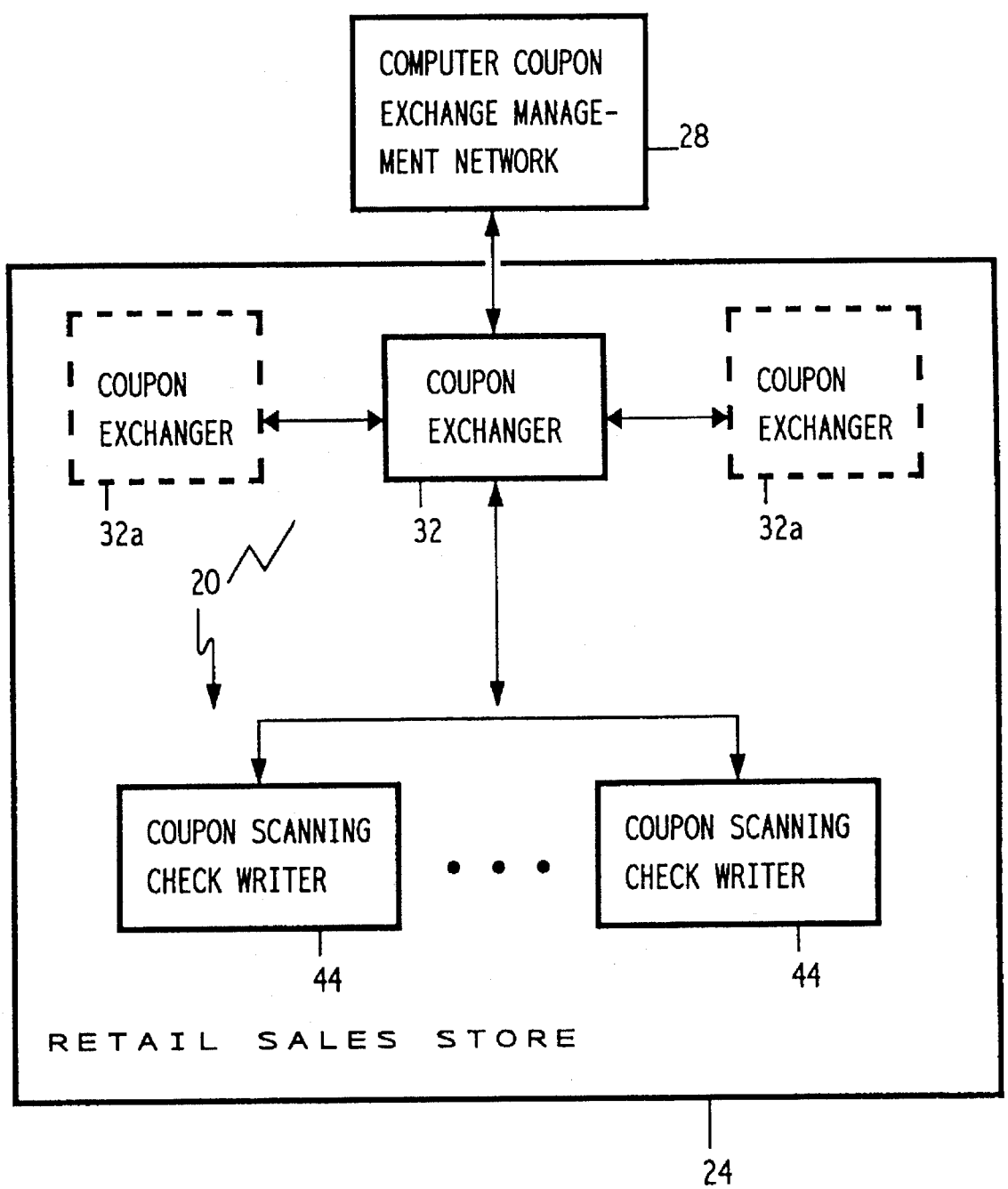

In FIG. 2, a high level block diagram is presented of an alternative embodiment of the coupon exchange system 20. This embodiment is similar to that of FIG. 1 with the exception of optional additional satellite coupon exchangers 32a. The satellite coupon exchangers 32a provide much of the same functionality as the coupon exchanger 32 in regards to allowing a consumer to exchange coupons; however, these coupon exchangers are neither linked to the management network 28 nor to the coupon scanning check writers 44. Instead, the satellite coupon exchangers 32a are linked to a full function coupon exchanger 32 from which coupon data is downloaded for the printing of coupons and to which the satellite coupon exchangers 32a provide data relating to the number of coupons that have been issued. Thus, the coupon exchanger 32 in this embodiment becomes a central data distributor and repository for data exchanged between various components of the coupon exchange system 20.

Figure 3:
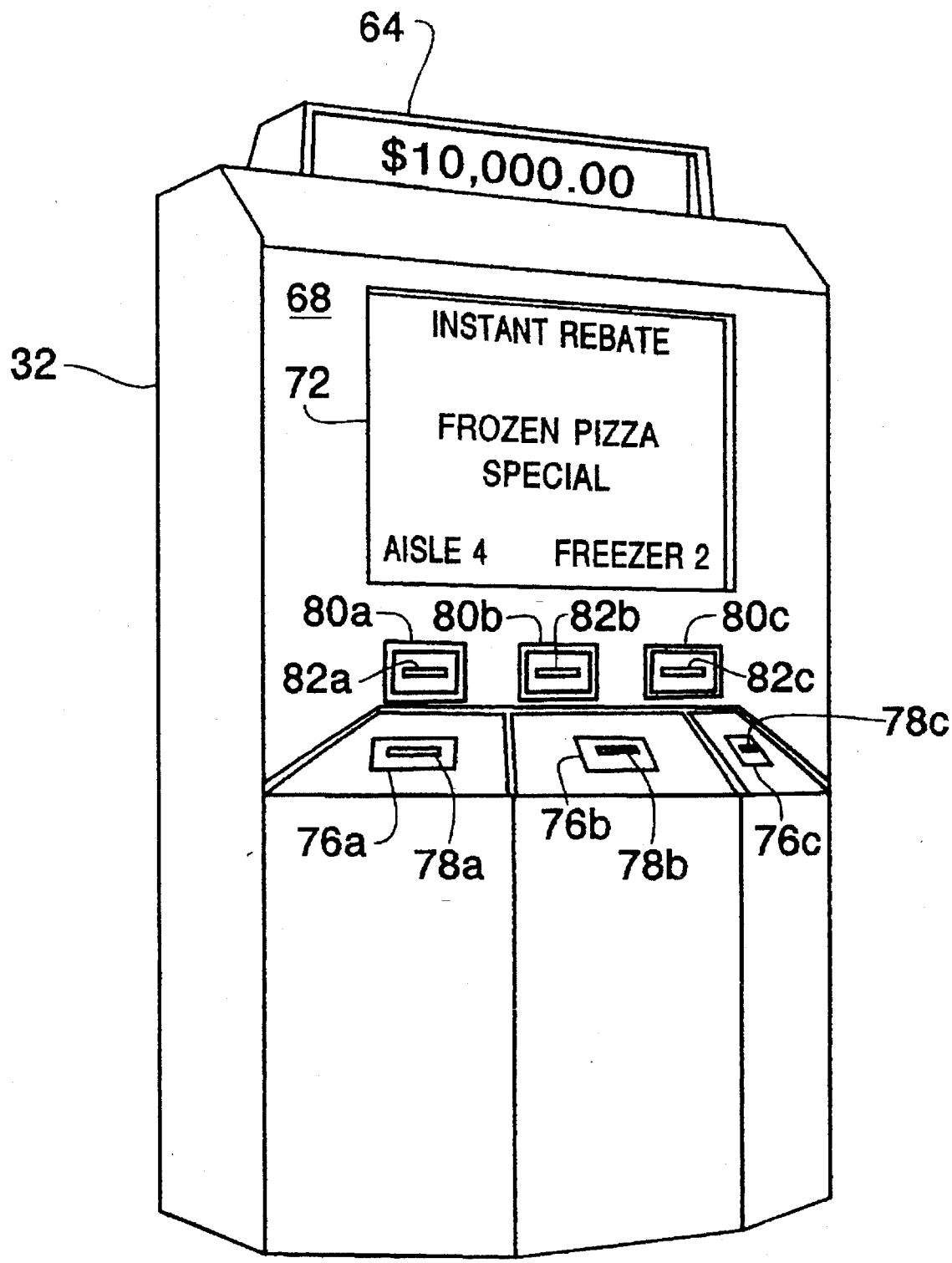
FIG. 3 presents a consumer's view of the coupon exchanger 32 of the present invention.

In FIG. 3, a consumer's view of the coupon exchanger 32 is presented. Beginning with the uppermost portion of the coupon exchanger 32, there is an informational display 64 for displaying information such as the total amount of coupons redeemed at the retail sales store 24 or the amount of cash paid out in checks written at the retail sales store 24 by the coupon exchange system 20. Below the informational display 64 and on the front 68 of the coupon exchanger, there is a product ad display 72. This display is a high resolution color graphics device for presenting advertisements of products for which the coupon exchange system 20 can print and redeem coupon exchange coupons 40. Note that as a special feature of the display 72, with each advertisement displayed, the isle number and other related information for locating the product being advertised within the retail sales store 24 is presented upon the display 72. Below the product ad display 72 are three pairs of coupon input units 76 and coupon output units 80. That is, there are pairs 76a,80a; 76b,80b; and 76c,80c, each pair having a coupon input slot 78 and a coupon output slot 82 and each such pair having identical functionality whereby a consumer inserts, for example, a conventional coupon 36 obtained from a newspaper into input slot 78a of coupon input unit 76a and subsequently a coupon exchange coupon 40 is output from coupon output slot 82a of coupon output unit 80a. Note that the coupon input slots 78 are sufficiently wide such that coupons 36 of various sizes can be input into a coupon input unit 76. Further note that the output coupon exchange coupons 40 are only for products known to the coupon exchanger 32. In the preferred embodiment, each output coupon exchange coupon 40 will correspond to a product which at some time is advertised on the display 72. Moreover, there is substantially no correlation between the type of coupon input into a coupon input unit 76 and the coupon exchange coupon 40 output from the paired coupon output unit 80. For example, the coupon exchanger 32 of the present embodiment does not use any data obtained from an input coupon 36 to determine the coupon exchange coupon 40 output. Instead, the coupon exchanger 32 iteratively cycles through stored coupon exchange product data to determine the coupon exchange coupon 40 to be printed. Further, an output coupon exchange coupon 40 bears substantially no correlation to the current advertisement displayed on display 72.

Figure 12:
FIG. 12 illustrates one embodiment of a coupon exchange coupon 40.

In FIG. 12, a coupon exchange coupon 40 is illustrated. The coupon exchange coupon 40 includes a cash rebate amount 900, an expiration date 904, a product description 908 describing the product for which the coupon applies, a location 912 within the retail sales store 24 where the product can be found, a bar code or universal product code (UPC) 916 identifying both the retail sales store 24 and the product for which the coupon applies and, finally, any game and/or bonus prize area 920 that may be provided on coupon 40.

Figure 4B:
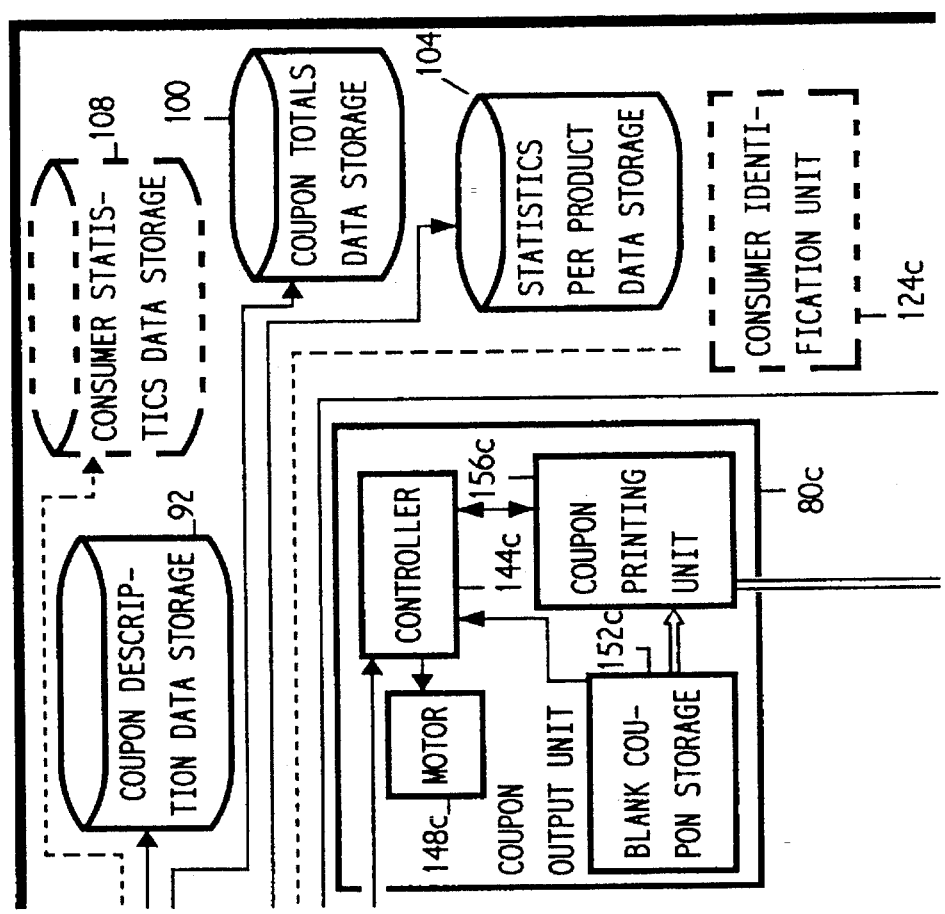
FIG. 4 is a block diagram illustrating the internal components of the coupon exchanger 32, together with its data and coupon flows.
Figure 4C:
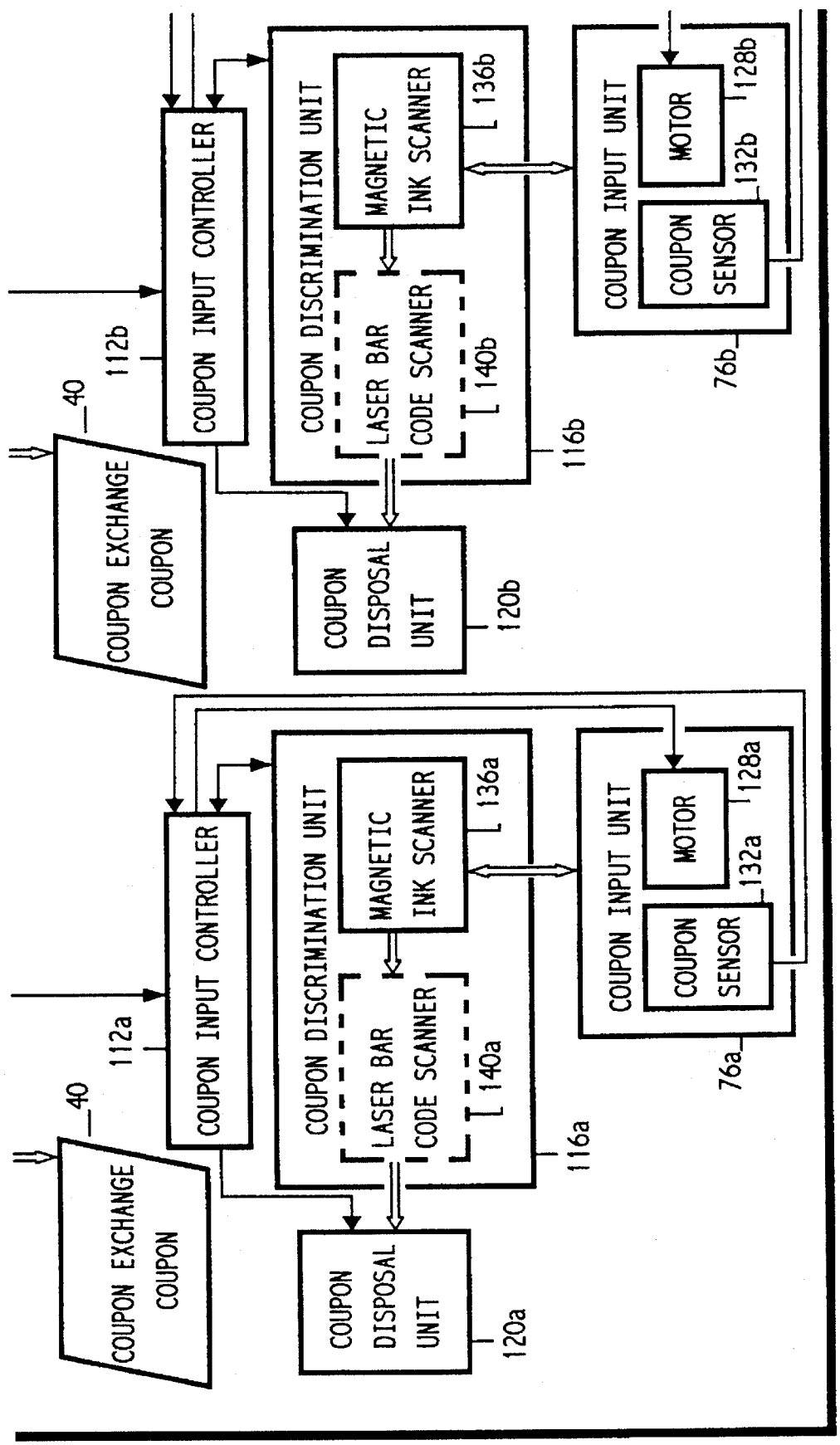
Figure 4D:
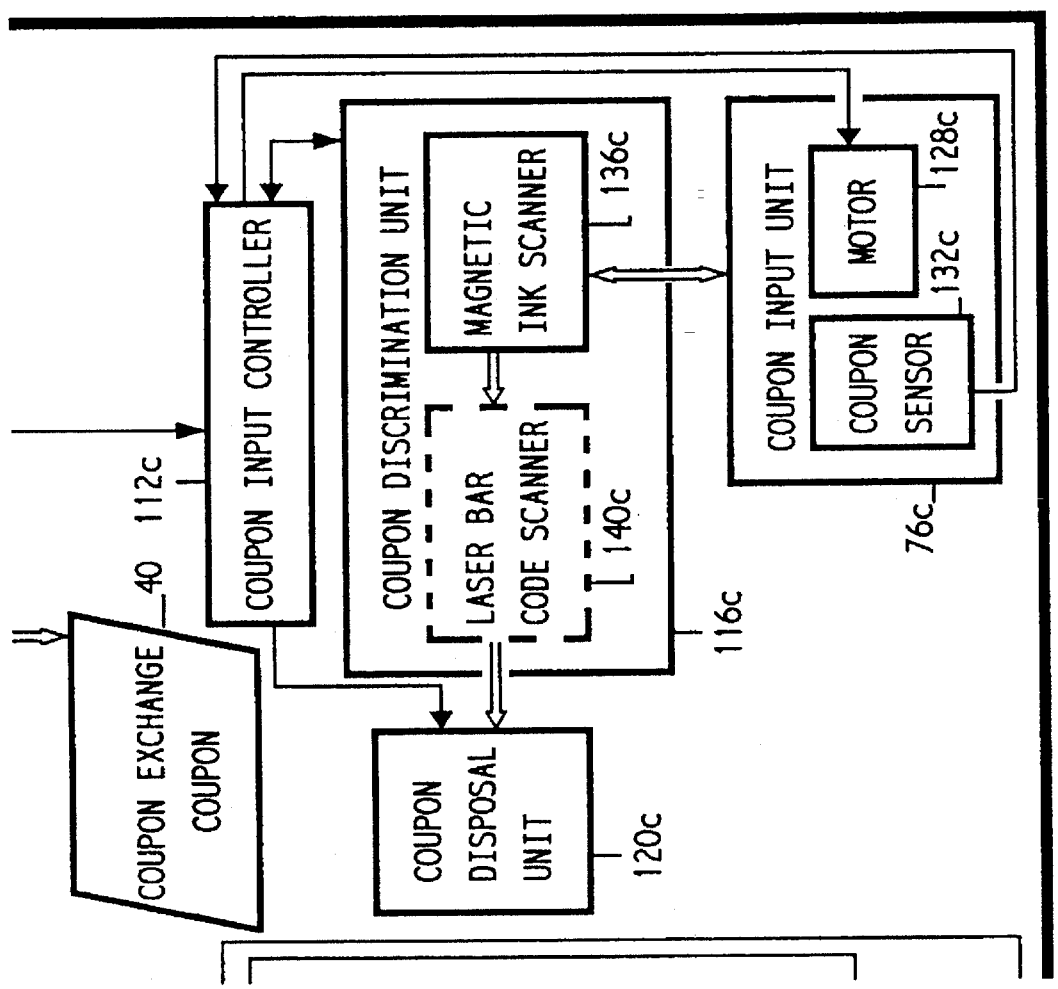

In FIG. 4, a block diagram is presented of the internal components of the coupon exchanger 32. In particular, the block diagram illustrates two preferred embodiments; that is, a restricted function coupon exchanger 32 including the solid lined components and arrows, and an enhanced function coupon exchanger 32 including both the solid lined and dashed lined components and arrows. The coupon exchanger 32 includes a network interface 84 having a modem (not shown) which communicates with the coupon exchange management network 28 and each of the coupon scanning check writers 44. The network interface 84 exchanges data with a processor 88. The processor 88, with its included program memory (not shown), controls the operation and data flows of the coupon exchanger 32. In this regard, the processor 88 communicates with five data storage areas for storing and updating data pertinent to the coupon exchange system 20. These data areas are:

(1.1) A coupon description data storage 92 for storing data related to the printing of a coupon exchange coupon 40. Records within this area include data indicating any logo of the product to be printed, the amount for which the coupon can be redeemed, any limitations as to the quantity of the product that can or must be purchased, and a product identifier such as an encoding of the product's universal product code (UPC). Further, data is also stored in this storage area representing a store identification code which is used by the coupon scanning check writer 44 in determining whether the coupon is valid (i.e., issued) in the store where it is presented for redemption. In addition, data required for the description of bonus prizes or checks to be printed upon a coupon exchange coupon 40 may also be stored in this area;

(1.2) A product ad data display storage 96 is used for storing advertisement data to be displayed on display 72. That is, for each product advertised by the coupon exchanger 32, this storage area includes a high resolution color graphics encoding of an advertisement for the product, together with a reference to location data designating where the product is located within the retail sales store 24. Note that at least the location data is also used in printing coupon exchange coupon 40;

(1.3) A coupon totals data storage 100 providing storage for various totals related to the coupon exchange coupons 40. Included in this storage area are various totals tallied from a specified (and modifiable) date. Included are the following totals: the total number of coupon exchange coupons 44 printed, the total number of coupon exchange coupons 40 redeemed, the total cash value of checks written for redeemed coupon exchange coupons 40, the total cash value of bonus checks written and, optionally, the total number of consumer purchase transactions where coupon exchange coupons 40 were used;

(1.4) A statistics per product data storage 104 providing a storage area for information related to coupons processed by the coupon exchange system 20. For example, the following fields per product are included in this data storage area: the total number of coupon exchange coupons 40 redeemed for the product subsequent to a specified date, the total amount paid out for the product subsequent to a specified date, and the total number of coupon exchange coupons 40 issued for the product subsequent to a specified date. Additionally, in the enhanced embodiment of the coupon exchanger 32 where any bar codes on coupons 36 input into a coupon input unit 76 are detected, information may be kept in this area regarding the number of each type of input coupon 36 into the coupon exchanger 32; and (1.5) A consumer statistics data storage 108 for storing information related to coupon exchange system 20 consumers who are identified by a coupon exchange system identification card 268 (see FIG. 5) issued to consumers who request one. This data storage area includes data related to the number and types of coupons used by particular consumers. As an aside, note that such information on consumer buying activities is extremely valuable for product producers and distributors.

Returning now to processor 88 and its connections with other components of the coupon exchanger 32, the processor 88 outputs color pixel display data from the product ad data display storage 96 to the product ad display 72 such that an advertisement is displayed as depicted in FIG. 3. Note that the processor 88 iteratively cycles through the advertisements within the product ad data display storage 96 presenting a different advertisement to the product ad display 72 approximately every 2–5 minutes. The processor 88 also retrieves data regarding various totals and presents this data to the informational display 64 to be displayed thereon as a promotional display thereby creating interest in the coupon exchange system 20. In particular, the total amount of cash paid out can be displayed on the informational display 64 as depicted in FIG. 3.

In regards to coupon exchanger 32 interactions with consumers and coupons, the processor 88 communicates with three identical collections of coupon exchanger 32 components whereby each collection includes a coupon input unit 76, a coupon input controller 112, a coupon discrimination unit 116, a coupon disposal unit 120, a coupon output unit 80 and, optionally, in some embodiments of the coupon exchanger 32 a consumer identification unit 124. Note that each such collection is identified by having the same letter suffix on the labelings of the components of the collection. Thus, for example, one such collection has an "a" as the suffix of its labelings while the other two collections have "b" and "c" as their suffix labelings. Further note that double lined arrows are used to indicate the pathways by which coupons travel within the coupon exchanger 32.

Given that the three collections discussed above are identical, only one such collection will be discussed here. Thus, commencing with the coupon input controller 112*a*, this controller controls the actions of the coupon input unit 76*a*, the coupon discrimination unit 116*a* and the disposal unit 120*a*, as indicated by arrows from the coupon input controller 112*a* to these units. In particular, with regard to the coupon input unit 76*a*, the coupon input controller 112*a* controls the activation of a motor 128*a* for receiving a conventional coupon 36 from a consumer. The activation of the motor by the controller 112*a* is due to the sensing of an input coupon by coupon sensor 132*a*. That is, the coupon sensor 132*a*, upon sensing a coupon, responds with signals to the coupon input controller 112*a* which in turn activates the motor 128*a* to receive the input coupon. The coupon is thereby transferred to the coupon discrimination unit 116*a* where various determinations are made with regard to the type of coupon input. In particular, the magnetic ink scanner 136*a* determines if there is magnetic ink on the input coupon. Note that all coupon exchange coupons 40 are printed with magnetic ink. Thus, the magnetic ink scanner 136*a* provides a capability for determining if the input coupon is a coupon exchange coupon 40. If magnetic ink is detected, then as the double lined arrow from the magnetic ink scanner 136*a* to the coupon input unit 76*a* indicates, the input coupon is rejected. More precisely, the magnetic ink scanner 136*a* provides signals to the coupon input controller 112*a* indicating that a coupon exchange coupon 40 has been detected. Subsequently, the coupon input controller 112*a* provides signals to the motor 128*a* to reverse its direction of rotation and thereby reject the coupon by outputting the coupon through the coupon input slot 78*a* used by the consumer to enter the coupon into the coupon input unit 76*a*. Alternatively, if no magnetic ink is detected on the input coupon by the magnetic ink scanner 136*a*, then the coupon is presumed to be a conventional coupon 36 and thus the coupon is transferred to coupon disposal unit 120*a* for shredding. Note that the shredding of the input coupon 36 is an important aspect of the present invention in that the shredding of the coupon reduces the capability for coupon fraud. Further note that, optionally, as an enhancement, in the transfer to the coupon disposal unit, a laser bar code scanner 140*a* may be provided to detect and record any bar code on the input coupon 36. If such a scanner is provided, information from a detected bar code is transferred to the coupon input controller 112*a* and subsequently transferred to the processor 88 wherein it is stored in the statistics per product data storage 104. Thus, the input controller 112*a* determines whether an input coupon is either rejected back to the consumer or shredded by coupon disposal unit 120*a*. Consequently, the coupon input controller 112*a* substantially receives only high level commands from the processor 88 such as, for example, reject all input coupons due to, for instance, a malfunction of the coupon output unit 80*a*.

In regards to the coupon output unit 80*a*, included within this unit is a controller 144*a*. The controller 144*a* responds to a message from the processor 88 requesting that a coupon exchange coupon 40 be printed by controlling the printing process of a coupon exchange coupon 40. More precisely, the controller 144*a* receives from the processor 88 a request to print a coupon together with the data to be printed on the coupon. Thus, the controller 144*a* receives any data describing the logo or the trademark of the product to be printed on the coupon exchange coupon 40 to be issued, plus data for printing at least fields 900–916 of FIG. 12. (Note that the game and/or bonus prize area is preferably preprinted on the coupon exchange coupon 40.) Further, note that if a consumer identification code has been entered via consumer identification unit 124*a*, then the consumer's identification is also transferred to the controller 144*a* to be printed on the output coupon exchange coupon 40. Conversely, the controller 144*a* provides the processor 88 with various control signals regarding the status of the printing of coupon exchange coupons 40.

When a coupon exchange coupon 40 is to be printed, the controller 144*a* activates an output motor 148*a* to transfer a blank coupon exchange coupon from the blank coupon exchange storage 152*a* to the coupon printing unit 156*a*. Note that the blank coupon storage 152*a* includes a roll of blank coupons such that the coupons on the roll are pre-perforated for easy separation from one another. Further note that, as mentioned above, such blank coupons may also include various preprinted games or bonus prize opportunities. Thus, for example, in one embodiment of the coupon exchange coupons 40, each coupon includes a "rub-off." That is, there is a portion of the coupon with an opaque coating over it which can be rubbed off by a consumer to determine whether a prize winning labeling is printed underneath. Once the coupon printing unit 156*a* has received a blank coupon from the blank coupon storage 152*a*, the coupon printing unit commences to print the coupon data received by the controller 144*a* from the processor 88. Subsequently, once printing is completed for the coupon exchange coupon 40, the motor 148*a* (or similar such motor) is activated to output the coupon exchange coupon to the consumer.

Figure 5A:
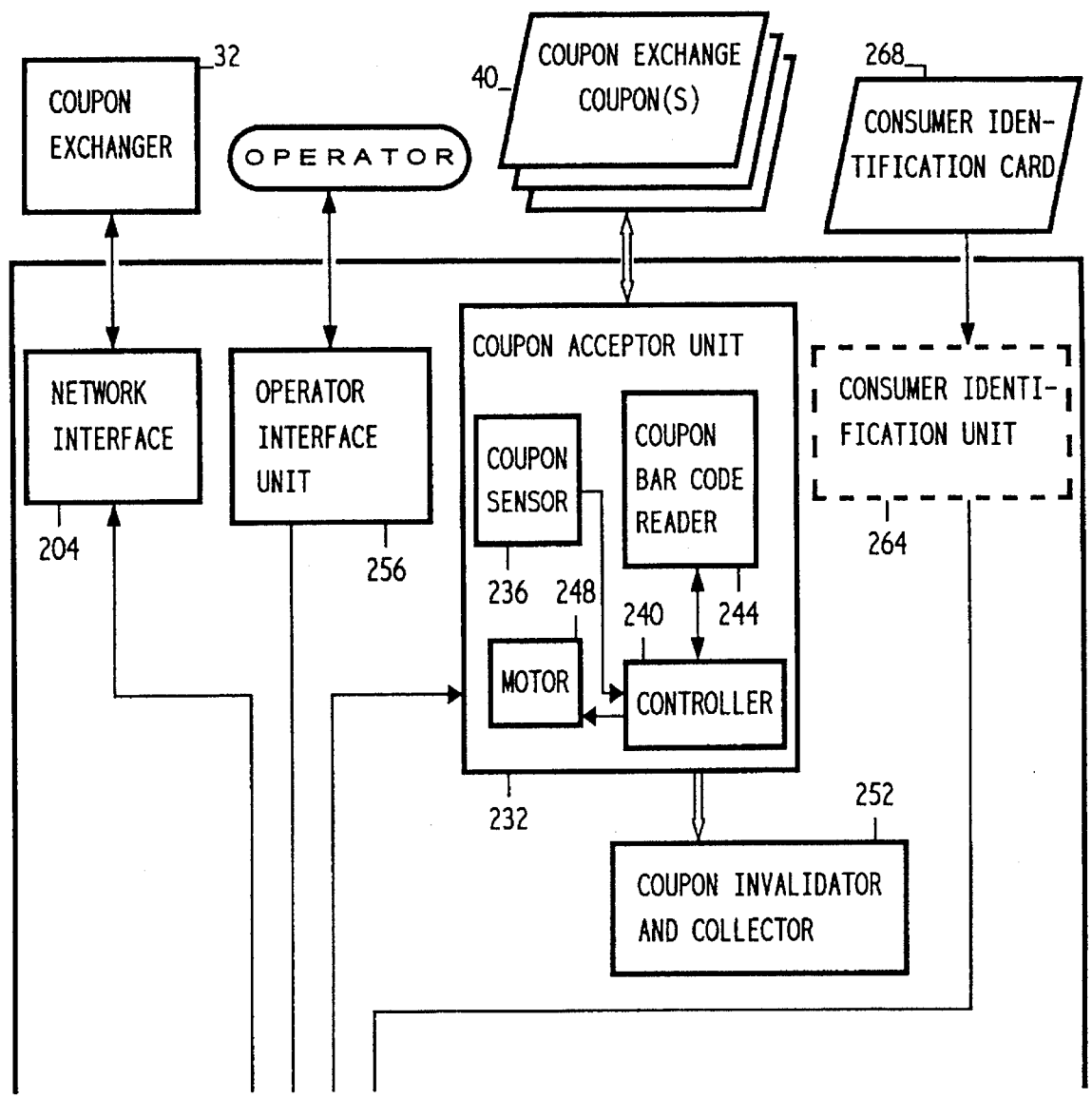
FIG. 5 illustrates a block diagram of the internal structure of a coupon scanning check writer 200, together with its data and coupon flows.
Figure 5B:
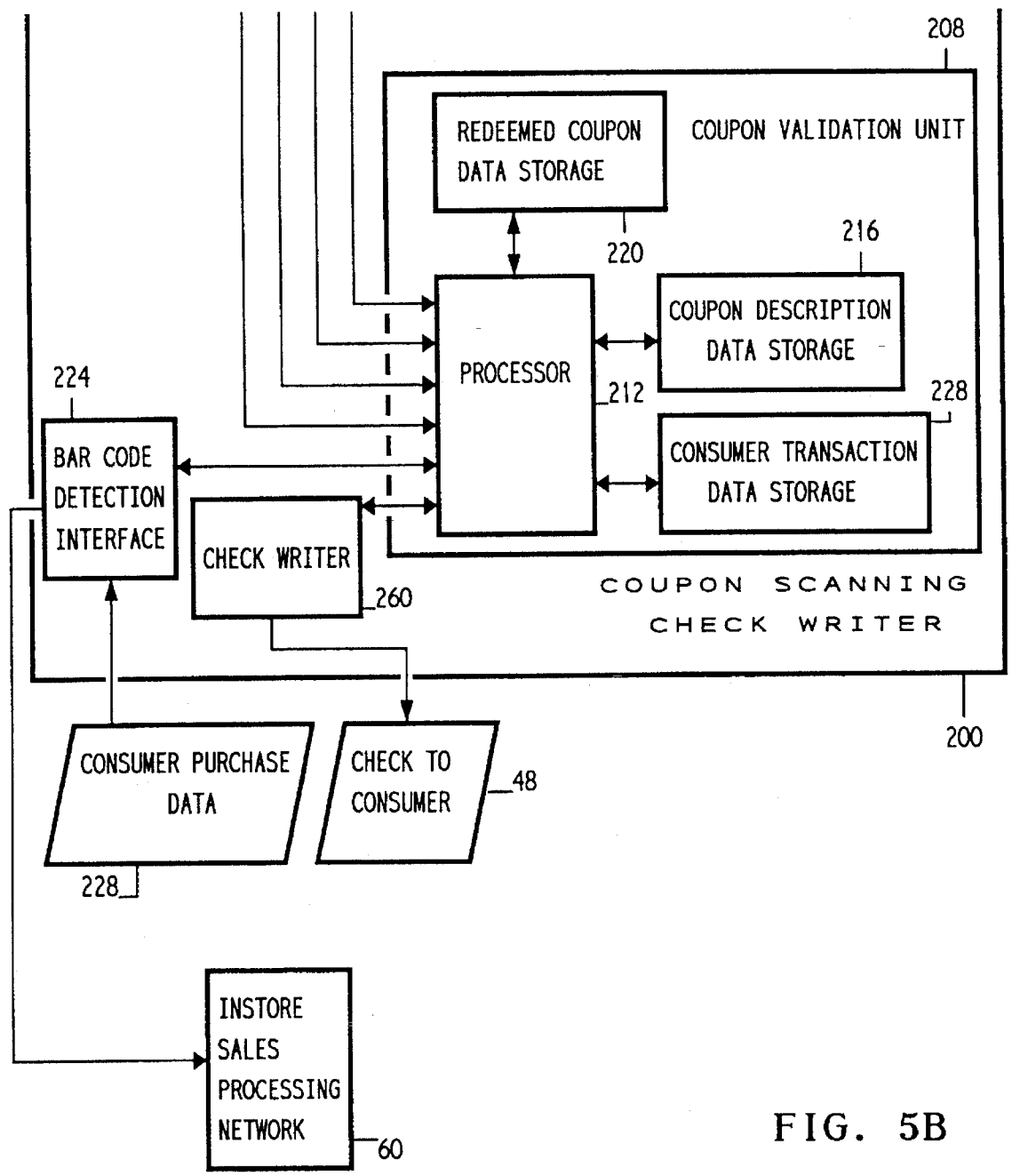

In FIG. 5, a block diagram of the coupon scanning check writer 200 is illustrated together with various inputs and outputs. The coupon scanning check writer 200 communicates with the coupon exchanger 32 via a network interface 204. The network interface 204 in turn provides this data to the coupon validation unit 208 where it is stored by a processor 212 into the coupon description data storage 216 for subsequent use in determining the validity of coupon exchange coupons 40 input to the coupon scanning check writer 200, as will be discussed below. Conversely, the coupon validation unit 208 transmits data regarding the redemption of coupon exchange coupons 40 to the coupon exchanger 32 via the network interface 204. To accomplish the transfer of data to the coupon exchanger 32, the coupon validation unit 208 includes a redeemed coupon data storage 220 which is used to store data relating to a single consumer cash transaction. That is, the redeemed coupon data storage 220 includes the total number of coupons redeemed in the transaction, the number of coupons redeemed per product type, the total cash value of the redeemed coupons and the cash value of the redeemed coupons per product promoted by the coupon exchange system 20. Thus, the data stored in the redeemed coupon data storage 220 is accessed by the processor 212 and presented to the network interface 204 for transmission to the coupon exchanger 32.

The coupon scanning check writer 200 also includes a product code detection interface 224. This interface monitors the electrical signals corresponding to bar code data included in consumer purchase data 228 being transferred from the product bar code scanner 56 to the in store sales processing network 60. When a signal corresponding to a bar code is detected by interface 224, an encoding of the signal is sent to processor 212 for storage in consumer transaction data storage 228. The consumer transaction data storage 228 stores the UPC labeling for each product purchased by the consumer of the current cash transaction for which coupon exchange coupons 40 can also be redeemed. Also included in the coupon scanning check writer 200 is a coupon acceptor unit 232. Using double lined arrows to again denote the pathways used in transferring coupons, coupon exchange coupons 40 are input into the coupon acceptor unit 232 for determining whether any such coupon is eligible for redemption. More precisely, the coupon acceptor unit 232 includes a coupon sensor 236 for sensing the input of a coupon and signaling a controller 240 when a coupon is detected. The controller 240 thereby activates a motor 248 to transfer the input coupon to the coupon bar code reader 244 where a determination is made as to whether the input is a coupon exchange coupon 40 eligible for redemption. To make this determination, the controller 240 transfers signals corresponding to the bar code read from the input coupon exchange coupon 40 to the processor 212 such that a determination can be made as to whether the coupon can be accepted for redemption. If the coupon is accepted for redemption, then the processor 212 signals the controller which in turn activates the motor 248 (or similar such motor) to transfer the coupon to the coupon invalidator and collector 252 whereby the input coupon exchange coupon 40 is invalidated, preferably by ink striping the bar code 916, and collected. Alternatively, if the controller 240 receives signals from the processor 212 indicating that the coupon is unacceptable for redemption, then the controller 240 reverses the motor 248, thereby causing the input coupon to be rejected from the coupon acceptor unit 232.

Once all products for a consumer transaction have been scanned by the product bar code scanner 56 (FIG. 1), and all coupon exchange coupons 40 for this transaction have been entered into the coupon acceptor unit 232, then an operator interacts with an operator interface unit 256 for initiating the activation of a program to determine the amount of each check 48 to be printed and presented to the consumer. Thus, in a preferred embodiment, the operator interface unit 256 is substantially nothing more than "a pay button" which is pressed by the operator to activate the above mentioned check printing program. Alternatively, if the retail sales store 24 includes a sales station 52 without a product bar code scanner 56, then the coupon scanning check writer 200 associated with this sales station includes an expanded operator interface 256 having a keyboard whereby the UPC labels on products can be input manually.

Once a determination has been made that a check 48 is to be printed, the processor 212 transfers data for each new check 48 to be written to a check writer 260 which prints the check which is then presented to the consumer. In this context, the data received by the check writer 260 includes the amount of the check, the date the check is issued, the check number, the bank routing number, and any check labeling information such as whether the check is for the redemption of coupons, or is a randomly issued bonus check as a prize for using the coupon exchange system 20, or is a promotional check typically only redeemable for merchandise or services at a local business.

It is noteworthy as an important aspect of the present invention that the checks 48 do not have the retail sales store 24 as the payor. Instead, the checks 48 are drawn on an account specific to the enterprise operating the coupon exchange system 20. Thus, as a result, the retail sales store 24 receives full retail price for the products sold to which only coupon exchange coupons 40 are redeemed.

As a final optional feature in some embodiments of the coupon scanning check writer 200, there can be a consumer identification unit 264. This unit is similar to the optional consumer identification units 124 of the coupon exchanger 32. Thus, prior to the input of the coupon exchange coupons 40 into the coupon acceptor unit 232 during a consumer transaction, if the consumer presents a coupon exchange consumer identification card 268, the card is input into the consumer identification unit 264 and the consumer identification data upon the card is read and transferred to the consumer transaction data storage 228 via the processor 212. As will be detailed below, this consumer identification data is used in two ways: it is stored with UPC labelings of products purchased such that product promoters can determine which consumers buy which kinds of products; in addition, the consumer identification data is used in awarding the consumer extra prizes or bonus points that can be used in selecting gifts as an incentive for using a consumer identification card 268.

Figure 6A:
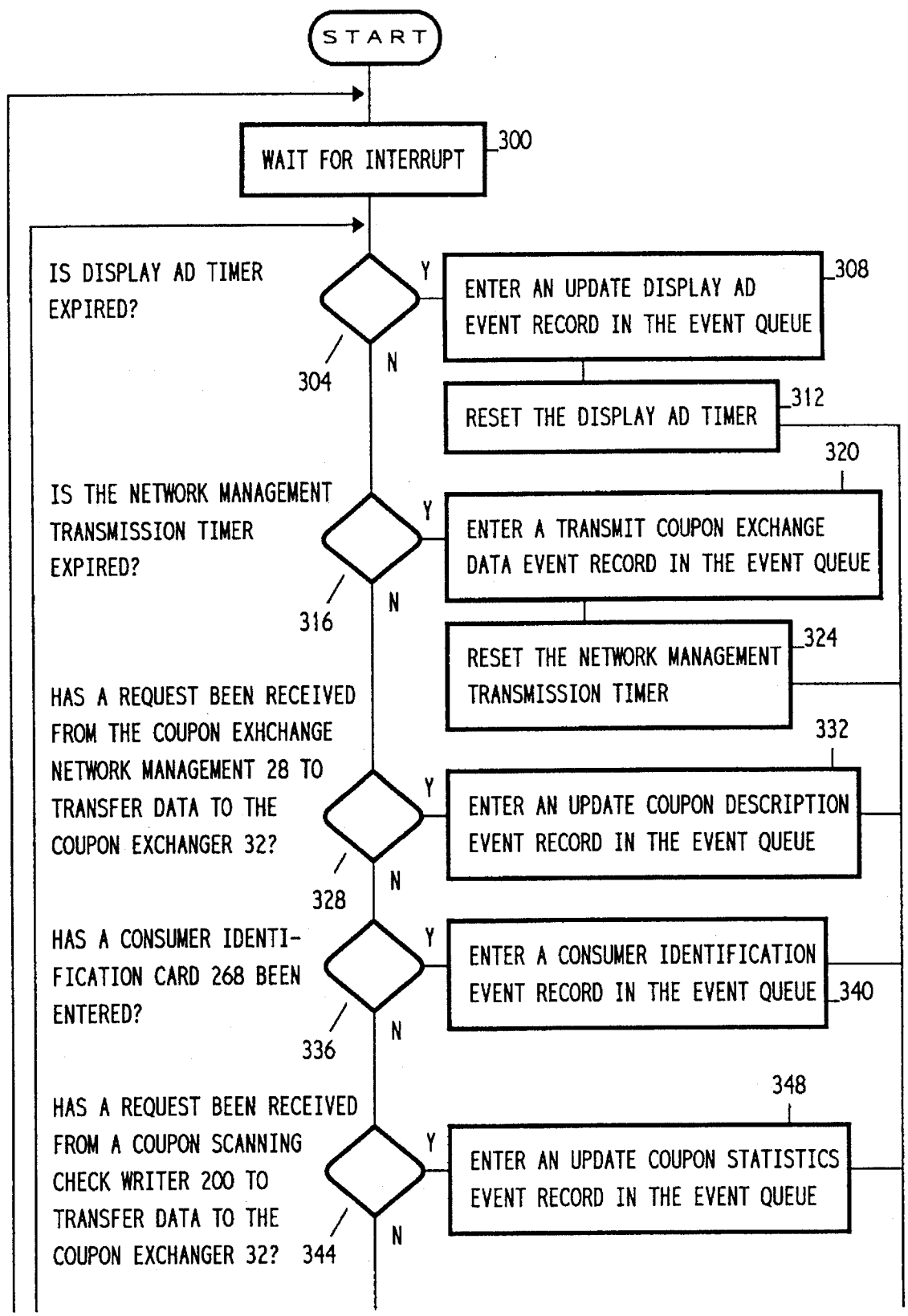
FIGS. 6A–6B is a flowchart illustrating the high level control program for the coupon exchanger 32.
Figure 6B:
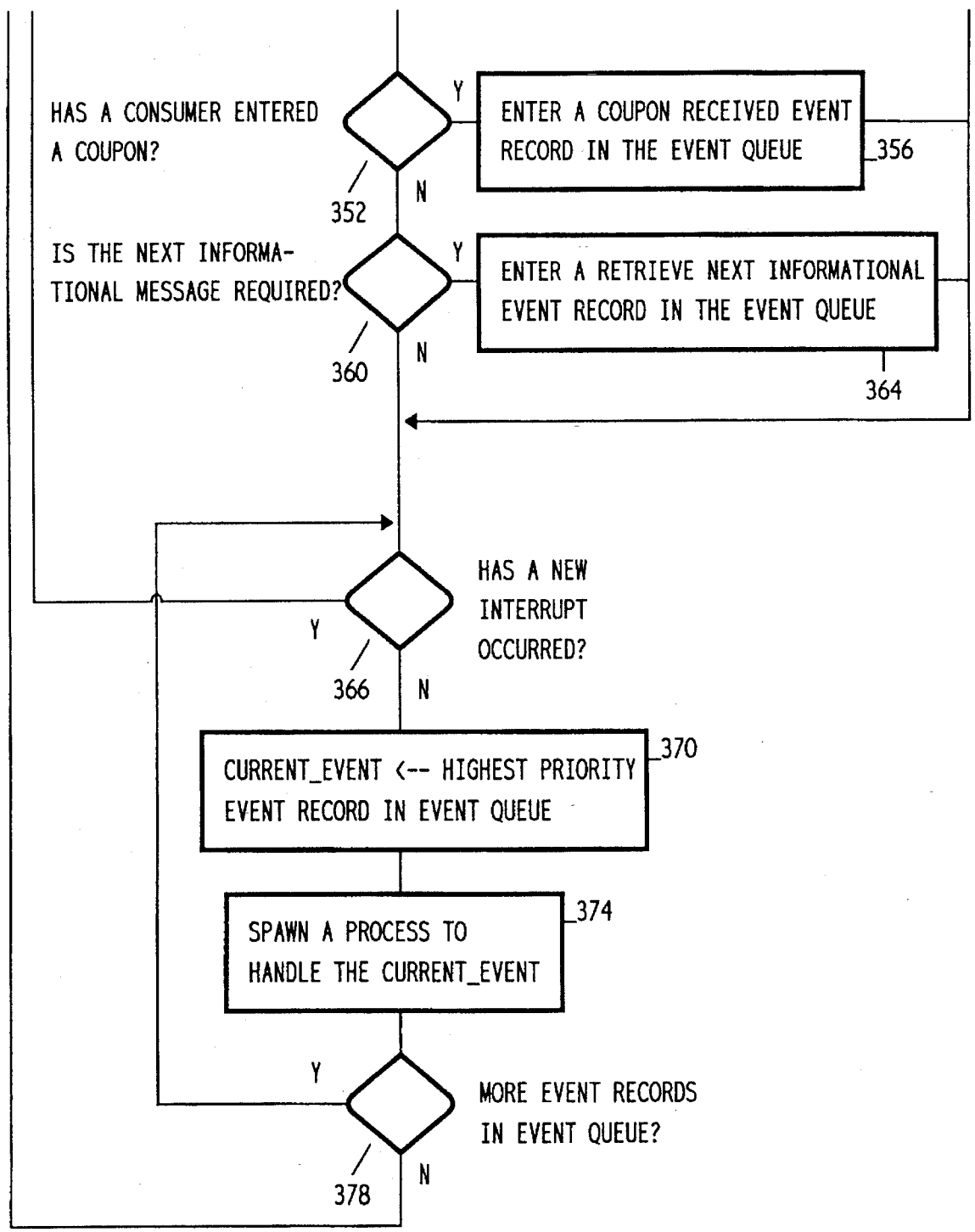

FIGS. 6A and 6B present a flowchart of the high level program steps used by the processor 88 of the coupon exchanger 32. In particular, this program illustrates how the processor 88 responds to various inputs substantially simultaneously. To accomplish this, the program is capable of creating various predetermined "event records" and placing these records in an "event queue" (not shown) associated with processor 88. That is, for each of the interrupts whose type is determined in the steps 304–360, an event record is created having the data necessary to respond to the interrupt. Subsequently, in steps 366–378, the event records in the event queue are used to spawn processes within the processor 88 such that the processor can multitask the processes for responding to the interrupts that have been received.

To explain FIGS. 6A and 6B in more detail, assume that the event queue initially has no event records within it and the program is at step 300 where it is waiting for an input interrupt. Once such an input interrupt occurs, in step 304 a determination is made as to whether the product ad display 72 should change the promotional advertisement it is displaying. Since the promotional advertisement displayed is to be changed every two to five minutes, a display ad timer is used to determine when the promotional ad should be changed. That is, in step 304 a determination is made as to whether the display ad timer has expired. If it has expired, in step 308 an event record is created for the updating of the product ad display 72 and this record is placed in the event queue. Subsequently, in step 312 the display ad timer is reset to correspond to the time interval for the new promotional ad which will be displayed when the event record created in step 308 is processed. Subsequently, the flow of control beyond step 312 leads to step 366 where a determination is made as to whether another interrupt has occurred. If so, the flow of control from step 366 loops back to step 304 to make a determination as to the type of the new interrupt.

Steps 304–312 and the branching to step 366 provide a template for the manner in which each type of interrupt is determined and processed. That is, a test is made as to the type of interrupt and if the interrupt has been identified then an event record is constructed which can be used by a spawned process in responding to the interrupt. Additionally, if the interrupt corresponds to a timer that has expired, the timer is then reset to correspond to the next interval of time.

Thus, if the test in step 304 is negative, then in step 316 a determination is made as to whether a timer has expired whereby the coupon exchanger 32 is now required to transmit to the coupon exchange management network 28 the information that has been captured regarding the data within the coupon totals data storage 100, the statistics per product data storage 104 and the consumer statistics data storage 108. Thus, if the network management transmission timer has expired in step 316, then in step 320 an appropriate event record is placed on the event queue and in step 324 the network management transmission timer is reset. Alternatively, if the test in step 316 is negative, then in step 328 a determination is made as to whether a request has been received indicating that coupon exchange network management data is to be transferred to the coupon exchanger 32. If so, then in step 332 an appropriate event record is created which will allow a spawned process to enter the new data to be received into the appropriate data storage areas of the coupon exchanger 32. In particular, the data received from the coupon exchange management network 28 typically modifies one or more fields of the records in the coupon description data storage 92 and/or the product ad data display storage 96. Alternatively, if the test in step 328 is negative, then a determination is made in step 336 as to whether a consumer identification card 268 has been entered into one of the consumer identification units 124. If so, then in step 340 an event record is created and placed on the event queue such that when a process is spawned corresponding to this event record, the consumer identification on the identification card 268 is captured for eventual printing on a coupon exchange coupon 40 output to the owner of the identification card 268. If, instead, step 336 results in a negative outcome, then in step 344 a determination is made as to whether the interrupt corresponds to a request from a coupon scanning check writer 200 to transfer data to the coupon exchanger 32. If so, then in step 348 an event record is entered into the event queue for spawning a process to capture the data to be transferred from the coupon scanning check writer 200. That is, the spawned process to handle this interrupt captures the data regarding the most recently completed consumer cash transaction stored in the redeemed coupon data storage 220 and the consumer transaction data storage 228. If alternatively the interrupt is not identified in step 344, then in step 352 a determination is made as to whether a consumer has entered a coupon into the coupon exchanger 32. If this step yields a positive result, then in step 356 an event record is created and entered into the event queue for processing the newly input coupon. In particular, since the coupon input controllers 112 substantially control the input of a coupon, the spawned process performed by the processor 88 substantially only provides a status signal to the appropriate coupon input controller 112 to either process the coupon or automatically reject the coupon back to the consumer if, for example, the corresponding coupon output unit 80 is inoperative. Alternatively, if step 352 provides a negative result, then in step 360 a determination is made as to whether the next informational message is required to be displayed on the informational display 64. If the results of this test is positive, then in step 364 an event record is created and placed on the event queue such that the corresponding process to be spawned retrieves one or more predetermined totals from the coupon totals data storage 100 and presents this data to the informational display 64 to be displayed. Subsequently, regardless of the path taken from the steps 304–364 in determining the type of interrupt that has occurred, the step 366 determines whether a new interrupt has occurred and, if so, as mentioned above, loops back to step 304 to categorize this new interrupt. Otherwise, if no new interrupt has occurred, then in step 370 the highest priority event record in the event queue is assigned to the variable "current_event." Note that in the present embodiment the event records are substantially prioritized by their ordering within the queue such that the first event records into the queue are the first event records processed. Subsequently, in step 374 a process is spawned to handle the event record referred to by the current_event variable. Following this statement a determination is made in step 378 as to whether there are more events in the event queue. If there are, then the flow of control loops back to step 366 to process the next highest priority event in the event queue. Otherwise, if no further event records are in the event queue, then the program loops back to step 300 and waits for the next interrupt.

Figure 7A:
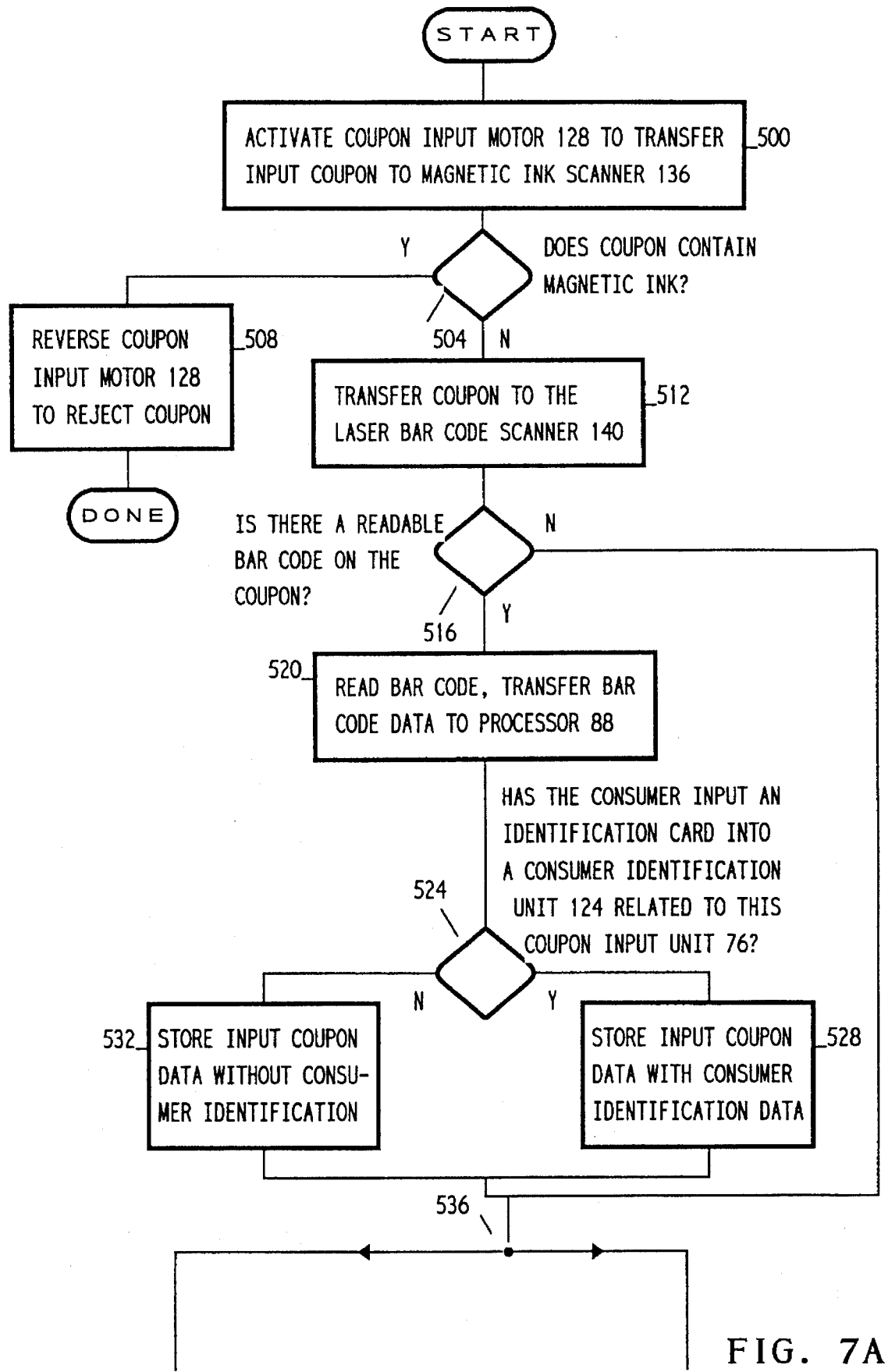
FIGS. 7A–7B is a flowchart illustrating the steps performed during the coupon exchange process by the coupon exchanger 32.
Figure 7B:
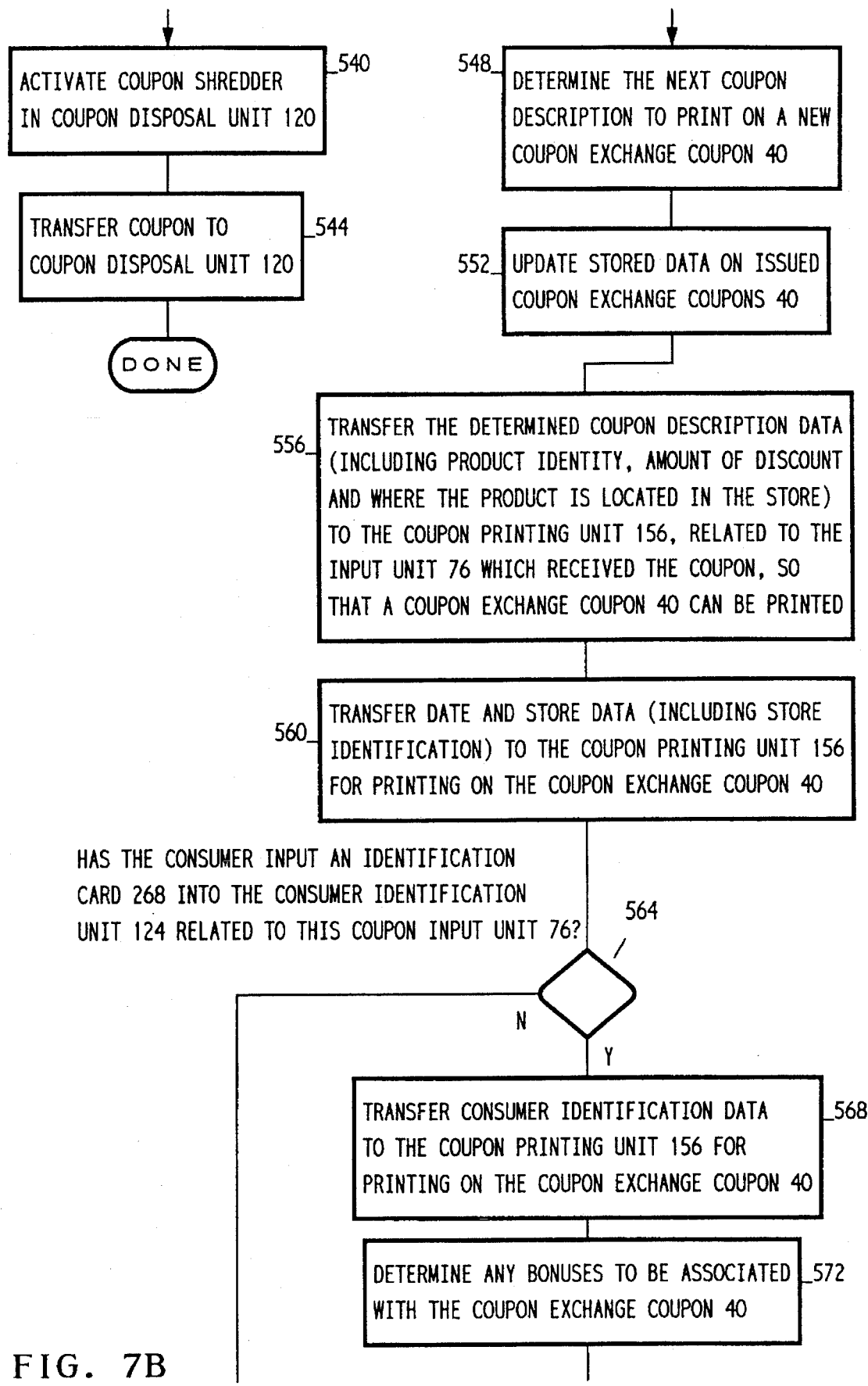
Figure 7C:
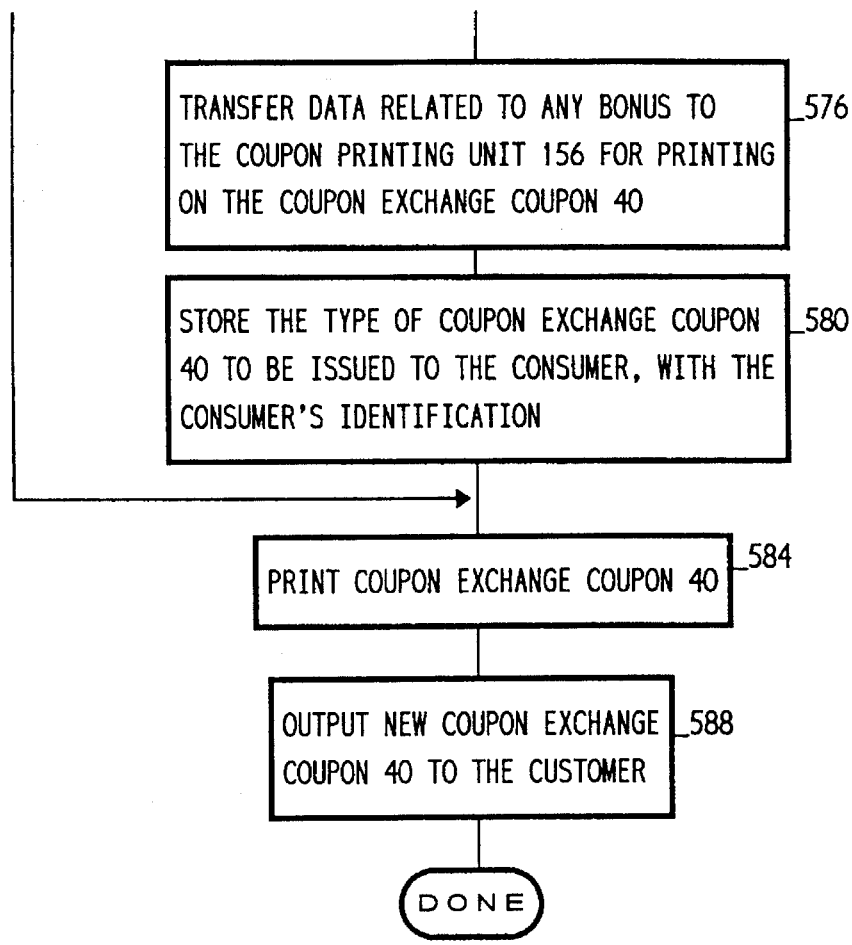

Referring now to FIGS. 7A and 7B, the operation of the coupon exchanger 32 during the processing of a coupon input by a consumer is presented in flowchart form. That is, the flowchart of these figures presents the steps performed by the process spawned to handle an event record created in step 356 of FIG. 6A. Further, this flowchart also presents the steps performed by other components of the coupon exchanger 32 in response to processor 88 actions. Note that the flowchart for these figures reference components described in FIG. 4 of the coupon exchanger 32. However, since there are three collections of coupon input/output components with suffixes a, b or c as described above, the flowchart of FIGS. 7A and 7B is made generic by referring only to the numbers without a letter suffix. It should be understood though, that whenever the coupon exchanger 32 components are referenced, the references are intended to have the same suffix letter applied to each component, where applicable. Further, this flowchart also includes the description of the steps for optional processing corresponding to the consumer identification units 124 and the laser bar code scanners 140. Thus, in particular, steps 516–532 and steps 564, 568 and 580 may be omitted in some embodiments of the coupon exchanger 32.

The flowchart of FIGS. 7A and 7B will now be described in some detail. Assuming a consumer has input a coupon into one of the coupon input units 76 and the processor 88 has responded to the coupon input controller 112 with a status signalling the controller to continue processing the input coupon, then in step 500 the coupon input motor 128 is activated to transfer the coupon to the magnetic ink scanner 136. In step 504 the magnetic ink scanner 136 determines whether there is magnetic ink on the input coupon. If there is, then, in step 508, the motor 128 is activated via coupon input controller 112 to reverse and reject the coupon back to the consumer since magnetic ink is used as the marker to identify coupon exchange coupons 40 and it is an aspect of the present invention for the coupon exchanger 32 to reject input of its own coupons. Subsequently, the process spawned on processor 88 to handle this event record terminates. Alternatively, if in step 504 magnetic ink is not detected, then the coupon input controller 112 causes the input coupon to be transferred to the laser bar code scanner 140 where any bar code found on the input coupon is read. In step 516 a determination is made as to whether there is a readable bar code on the input coupon. If such a bar code can be read, then in step 520 the bar code data is transferred via the coupon input controller 112 to the spawned process on processor 88 for handling input coupons such that the number of coupons input to the coupon exchanger 32 having the same bar code can be updated. In one embodiment of the coupon exchanger 32, such bar code data is stored in the statistics per product data storage 104. Alternatively, if the consumer statistics data storage 108 is included in the embodiment of the coupon exchanger 32, then the input coupon bar code is preferably stored with any consumer identification data input via the consumer identification unit 124. That is, the consumer identification data and the bar code data is stored within a record in the consumer statistics data storage 108. Note that steps 524–532 reflect the processing in the latter embodiment of the coupon exchanger 32. That is, if consumer identification data has also been obtained, then in step 532 this data is stored with the bar code data by the input coupon handling process as discussed above. Alternatively, if no such consumer identification data has been obtained, then in step 528 the bar code data may be stored with an anonymous or fictitious consumer identification record.

Subsequently, regardless of the outcome of the steps 516–532 processing fork 536 is encountered where processing is done substantially simultaneously by distinct components of the coupon exchanger 32. Thus, the path having the steps 540 and 544 corresponds to the processing remaining for the input coupon while the path having the steps 548–588 corresponds to the processing remaining for the new coupon exchange coupon 40 that is to be printed and output to the consumer.

In regards to the remaining processing of the input coupon, in step 540, the coupon input controller 112, upon receiving a status signal from the laser bar code scanner 140 regarding the reading of any bar code on the input coupon, issues a signal to activate a coupon shredder (not shown) in the coupon disposal unit 120. Subsequently, in step 544 the coupon is transferred to the disposal unit 120 where it is shredded thereby eliminating any possibility of fraudulent reuse.

In regard to the remaining steps for printing a new coupon exchange coupon 40, in step 548 the spawned input coupon handling process makes a determination as to which coupon description in the coupon description data storage 92 is to be used in printing the coupon. Note that in the preferred embodiment, this determination is made in a round robin fashion whereby the coupon description data records are iteratively and sequentially accessed such that each coupon description is used for printing a coupon exchange coupon 40 as frequently as any other such description. Subsequently, in step 552 the data within the statistics per product data storage 104 is updated. In particular, the record indicating the number of coupon exchange coupons 40 issued is updated and the number of coupon exchange coupons 40 having the coupon description determined in step 548 is also updated. Next, in step 556 the data determined in step 548 is transferred (by the spawned input coupon handling process) to the coupon printing unit 156 related to the coupon input unit 76 which received the input coupon. This data transfer, as reflected in the arrows of FIG. 4, is accomplished via coupon input controller 112. Subsequently, in step 560 data indicating the current date and the identification of the retail sales store 24 is also transferred to the coupon printing unit 156 for printing on the new coupon exchange coupon 40 to be issued. Thus, the coupon data for fields 900–916 of FIG. 12 have been supplied to the coupon printing unit 156.

Consequently, in step 564 a determination is once again made by the input coupon handling process as to whether consumer identification data has been obtained. If so, then in step 568 consumer identification data is also supplied to the coupon printing unit 156 for printing on the coupon exchange coupon 40. In step 572 the input coupon handling process activates a program to determine any bonuses to be associated with this new coupon if redeemed by the consumer whose identification data is to be printed on this coupon exchange coupon 40. In particular, bonus checks may be awards as well as "bonus points" which can be used to purchase items from a catalog. In step 576 the results of the determination in step 572 is transferred to the coupon printing unit 156 to be printed on the new coupon exchange coupon 40. In step 580, a record corresponding to the presently identified consumer is updated to reflect the type of coupon exchange coupon 40 to be issued to this consumer. Subsequently, regardless of the path taken from step 564, a coupon exchange coupon 40 is printed in step 584 and, in step 588, the coupon is output to the consumer via activation of the motor 148 by the controller 144.

Figure 8A:
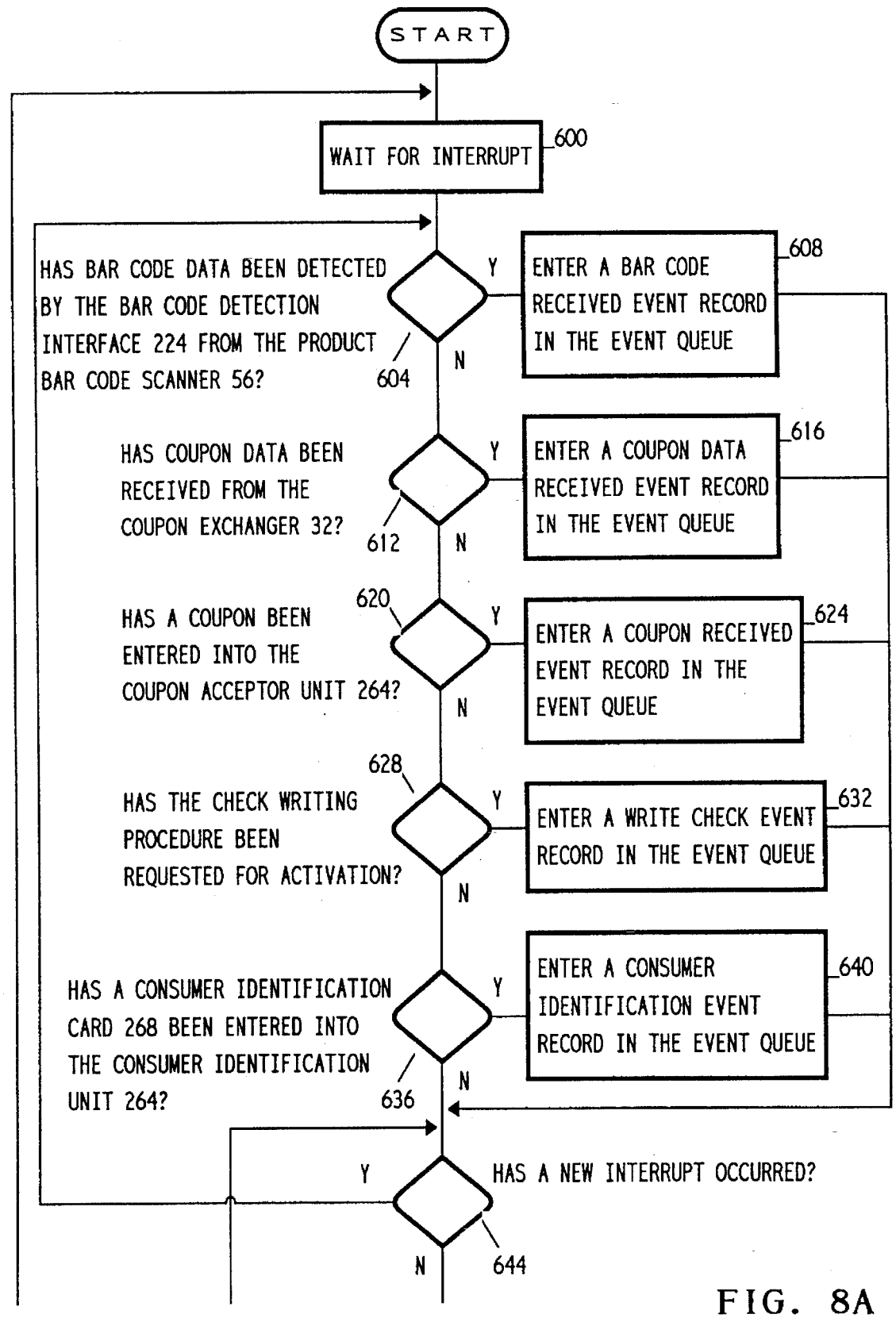
FIG. 8 is a flowchart illustrating the high level control program used by the coupon scanning check writer 200.
Figure 8B:
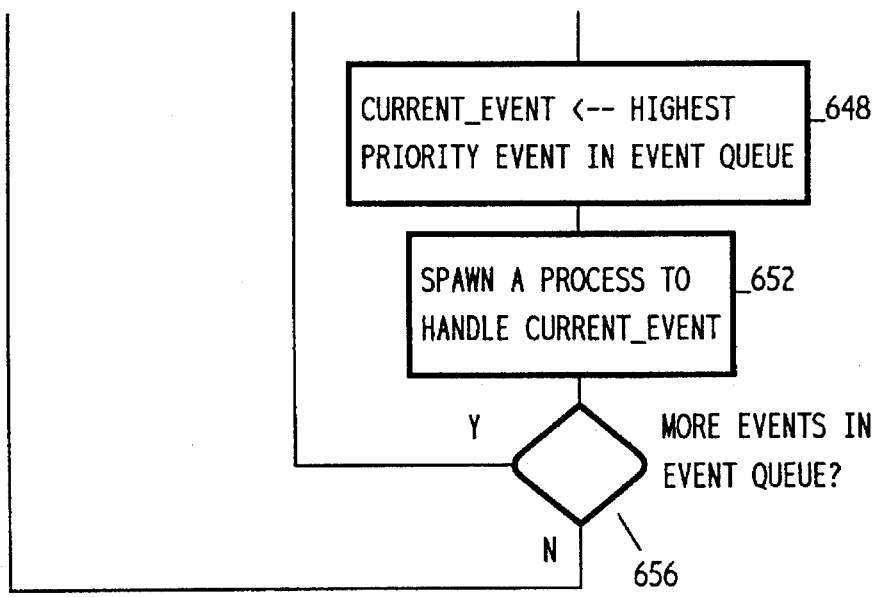

Referring now to FIG. 8, this figure illustrates the high level program performed by the processor 212 of the coupon scanning check writer 200. Note that this program has the same structure as the high level program performed by the processor 88 of the coupon exchanger 32. That is, there is a step in which the program waits for an interrupt to occur (step 600), subsequently the program determines the type of interrupt and creates an event record to be put on an event queue (not shown) associated with processor 212 (steps 608–640). Following this, the program provides a loop which iteratively spawns a process, on the processor 212, for responding to each interrupt which caused the creation of an event record (steps 644–656). Given this background, only a brief description will be given of the program. In particular, only a brief description will be given regarding the response to the five input interrupts to the coupon scanning check writer 200 addressed in FIG. 8. Thus, the discussion will be limited to steps 604–636.

Beginning now with step 604 and assuming that an interrupt has occurred, a determination is made as to whether bar code data has been detected by the bar code detection interface 224. If such data is detected, then in step 608 an event record is created and placed on the processor 212 event queue for spawning a process to respond appropriately to this interrupt. Note that FIG. 9 discussed below, describes the process that is spawned to handle event records of this type. Alternatively, if step 604 produces a negative result, then in step 612 a determination is made as to whether the input interrupt corresponds to coupon data being received from the coupon exchanger 32. If the result of this test is positive, then in step 616 an event record is created and placed in the event queue for spawning a process which updates the coupon description data storage 216 with new coupon description records including UPC data identifying the products for which a coupon exchange coupon 40 can be redeemed and the redemption value of each such coupon. If, however, step 612 provides a negative result, then in step 620 a determination is made as to whether a coupon has been entered into the coupon acceptor unit 264. If a coupon has been entered, then in step 624 an event record is created and placed on the event queue such that a process can be spawned to handle this interrupt. Briefly, the process to be spawned due to the event record here determines the validity of the coupon and then subsequently stores data related to the redemption of the coupon and invalidates the coupon. Note that the program performed by this process is given in FIG. 10 and will be discussed in detail below. If, on the other hand, the result of step 620 is negative, then in step 628 a determination is made as to whether there is a request for a check to be written by the coupon scanning check writer 200. If so, then an event record is created and put on the event queue for the spawning of a process to determine if a check should be written and, if so, then write the check for the appropriate amount. Note that FIG. 11 presents the steps performed by this process. Alternatively, if none of the previous four input interrupt tests yield a positive result, then in step 636 a determination is made as to whether a consumer identification card 268 has been entered into the consumer identification unit 264. If so, then as with the previous interrupts an event record is created and placed on the event queue for the spawning of a process to handle this input. Note that the process spawned causes the processor 212 to retrieve consumer identification data from the consumer identification unit 264 and store it in the consumer transaction data storage 228. Subsequently, regardless of the input interrupt detected, step 644 is encountered. Note that steps 644–656, along with their entering and leaving flow of control lines, have identical counterparts in FIGS. 6A and 6B. Therefore, the program of FIG. 8 spawns processes and waits for an input interrupt in exactly the same manner as described with respect to FIGS. 6A and 6B.

Figure 9:
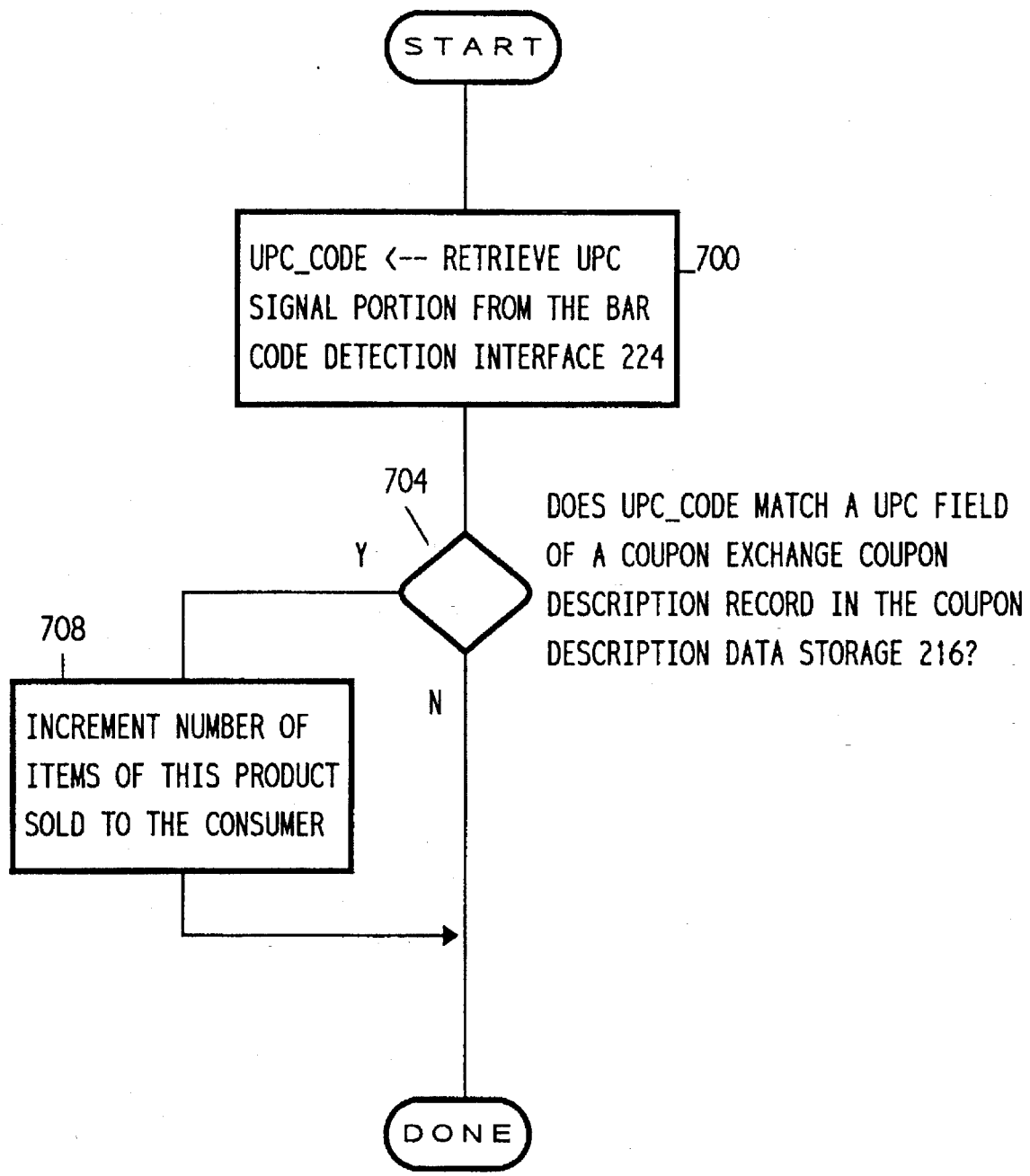
FIG. 9 is a flowchart representing the program used by the coupon scanning check writer 200 when a universal product code (UPC) signal is detected corresponding to a product being purchased by a consumer.

Referring now to FIG. 9, a flowchart is presented illustrating the steps performed by the process spawned on processor 212 to handle new bar code data detected by the bar code detection interface 224. Thus, in step 700 the processor 212 retrieves the UPC signal portion from the bar code detection interface 224 and assigns it to the variable UPC_CODE. Subsequently, in step 704 a determination is made as to whether the UPC data referenced by the variable UPC_CODE matches a UPC field stored in a record within the coupon description data storage 216. Whenever such a match occurs, step 708 is performed wherein the processor 212 creates or updates a record within the consumer transaction data storage 228 which maintains a count of the number of items purchased of each product for which the coupon exchange system 20 has issued coupon exchange coupons 40. Alternatively, if no such match occurs in step 704, then the processor 212 ignores the newly detected UPC data.

Figure 10A:
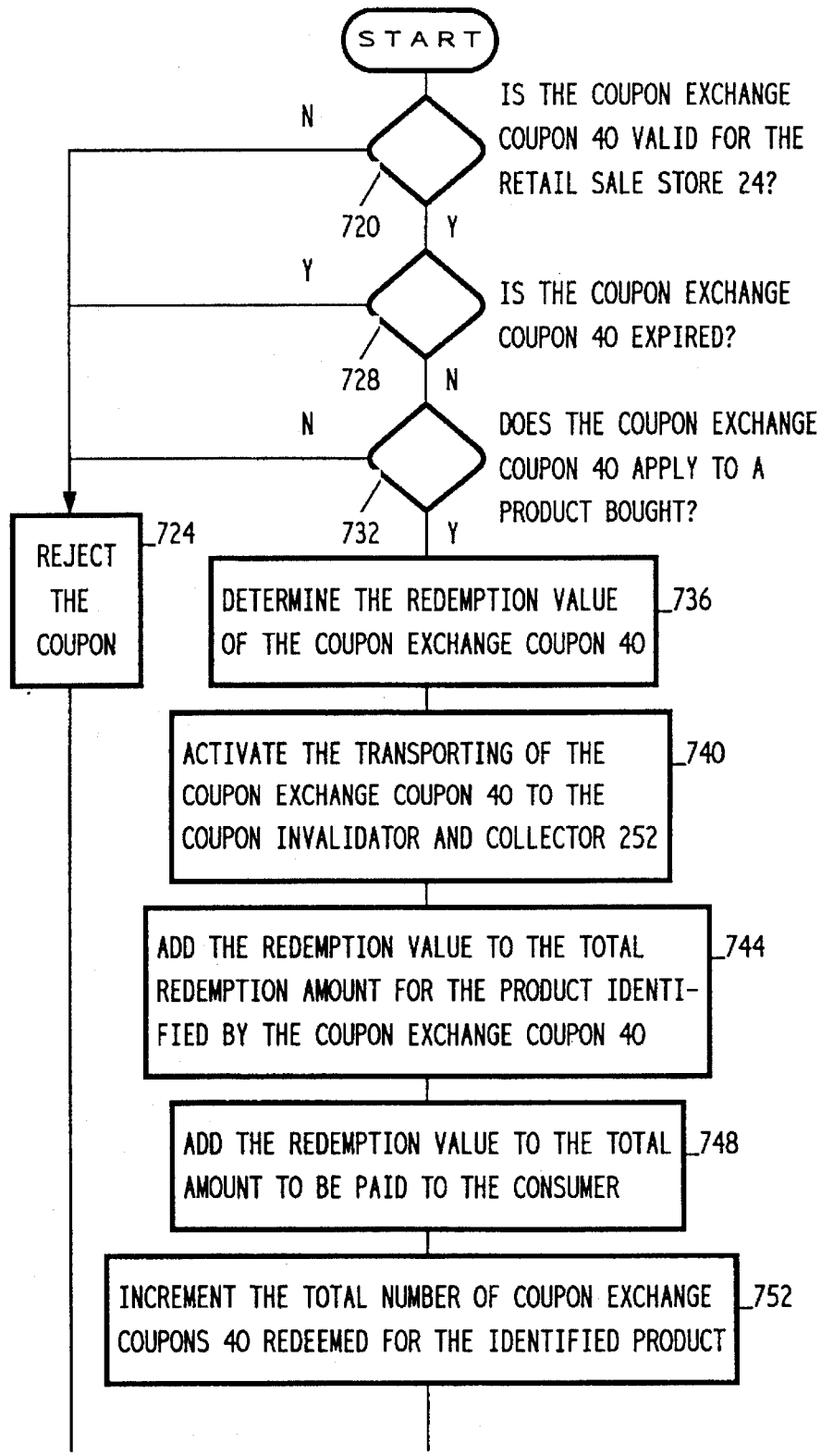
FIG. 10 is a flowchart illustrating the program used by the coupon scanning check writer 200 to process a coupon exchange coupon 40 that has been received during a consumer purchasing transaction.
Figure 10B:
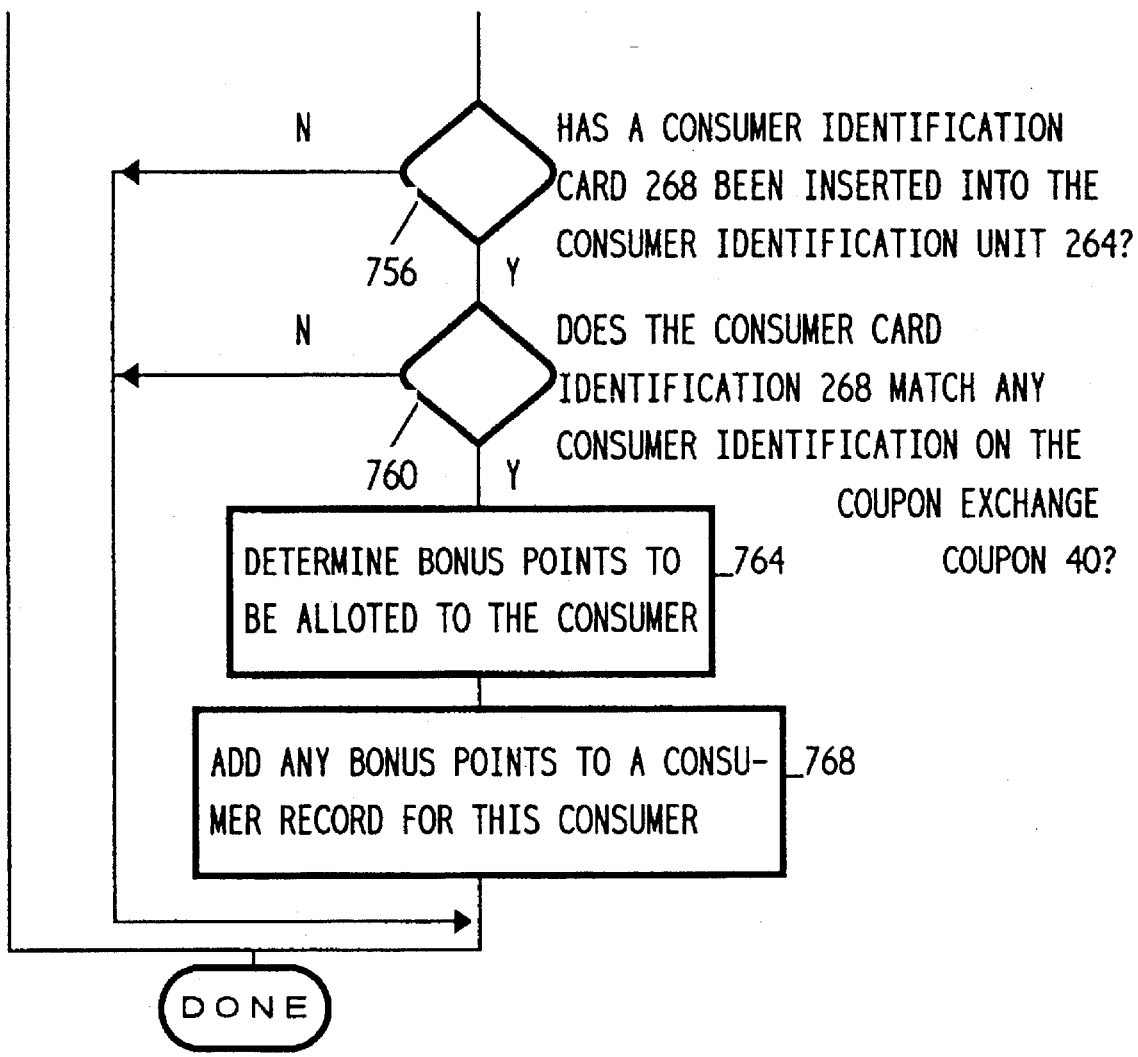
Figure 11A:
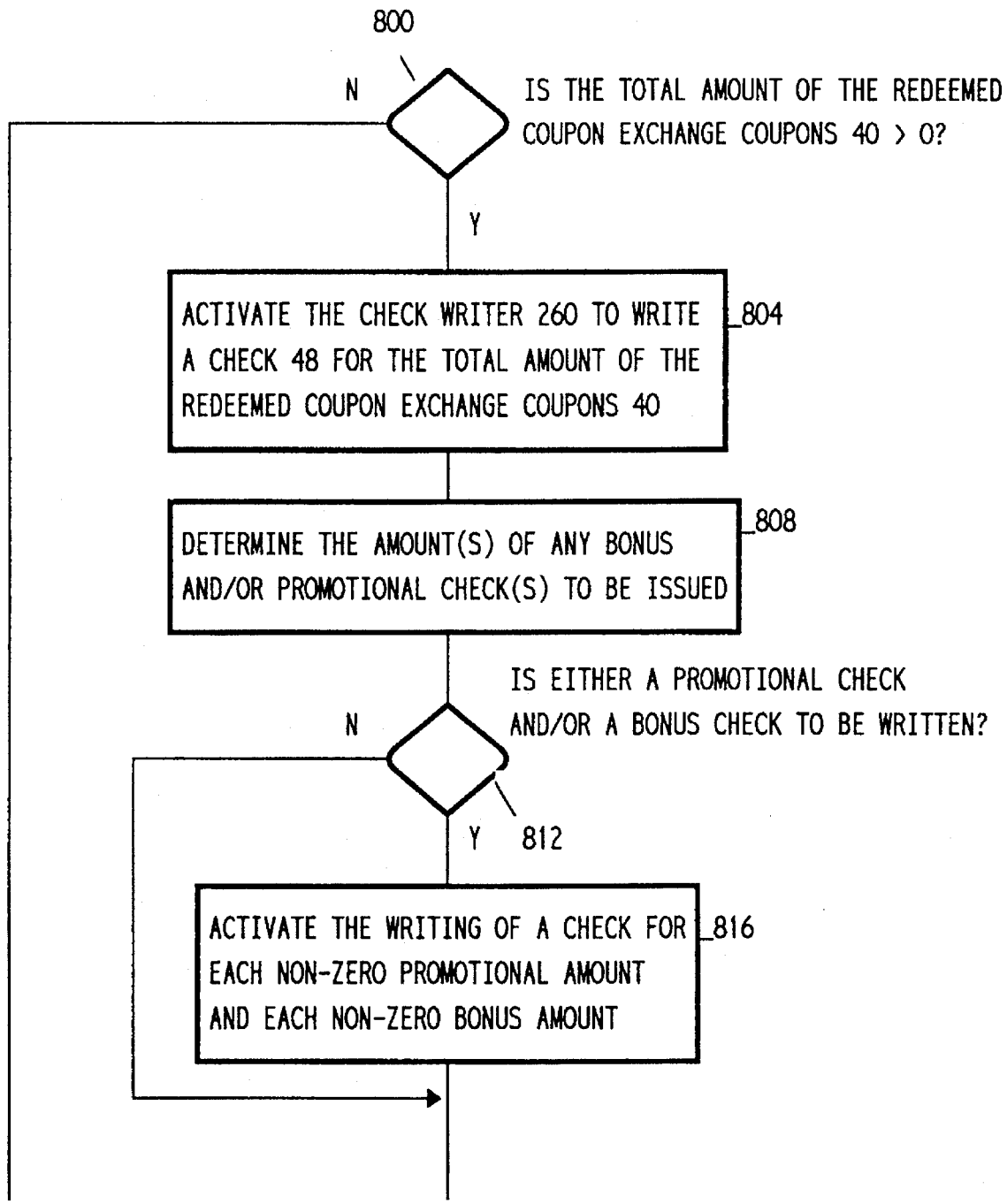
FIG. 11 is a flowchart illustrating the program used by the coupon scanning check writer 200 when a consumer purchasing transaction is complete and any coupon exchange system checks 48 are to be written.

Referring now to FIG. 10, a flowchart is presented illustrating the steps performed by a process spawned on processor 212 in response to the entering of a coupon into the coupon acceptor unit 232. It is assumed that the coupon sensor 236 has already signaled the controller 240 that a coupon has been entered and that the controller 240 has activated the motor 248 to transfer the coupon to the coupon bar code reader 244. Note as an aside, the present illustrated embodiment assumes that either only coupon exchange coupons 40 will be entered into the coupon acceptor unit 232, or the coupon bar code reader 244 is capable of detecting inputs that are not coupon exchange coupons and thereby signalling the controller 240 to reverse the motor 248 and reject the input. In the latter context, various detection devices within the coupon bar code reader 244 may be implemented. For instance, the coupon bar code reader 244 may include a magnetic ink scanner similar to the magnetic ink scanners 136 included in the coupon exchanger 32.

Thus, assuming that a coupon exchange coupon 40 has been entered into the coupon acceptor unit 232, then in step 720 a determination is made as to whether the current input coupon exchange coupon 40 is valid for the retail sales store 24. That is, it is an aspect of the present invention to assure that a coupon exchange coupon 40 from another retail sales store is not redeemed in the present retail sales store 24. To accomplish this, the processor 212 receives, via controller 240, the bar code data read by the coupon bar code reader 244 and decomposes this data to identify a predetermined portion of the data which indicates the identity of the retail sales store from which the coupon exchange coupon 40 was issued. Thus, if it is determined that the coupon exchange coupon 40 was issued by a retail sales store different from the current retail sales store 24, then in step 724 the coupon is rejected. Alternatively, if it is found that the coupon exchange coupon 40 was issued by the present retail sales store, then in step 728 a determination is made as to whether the coupon has expired. Note that in the preferred embodiment, it is desirable to have the coupon exchange coupons 40 redeemed soon after being issued. Therefore, the coupon exchange coupons 40 expire at the end of the day upon which they are issued. If the coupon has expired, then step 724 is again encountered and the coupon is rejected. Alternatively, if the coupon exchange coupon 40 is not expired, then in step 732 a determination is made as to whether the coupon exchange coupon 40 is eligible for redemption due to a product that has been purchased. To make this determination, the processor 212 compares the UPC data obtained from the coupon with UPC data stored in the consumer transaction data storage 228 identifying the products that have been purchased by the consumer. If no match is found, that is, the UPC data obtained from the coupon exchange coupon 40 does not match any UPC product data residing in the consumer transaction data storage 228 where a coupon exchange coupon 40 has not already been applied, then in step 724 the coupon is again rejected. Otherwise, the coupon exchange coupon 40 has past all tests and is now considered redeemable. Thus, in step 736 a determination is made as to the redemption value of the coupon exchange coupon 40 by retrieving a coupon description record from the coupon description data storage 216 having the UPC data which matches the corresponding data from the coupon exchange coupon 40 and further includes the redemption value of the coupon. Subsequently, since all the data required for processing the input coupon exchange coupon 40 has been retrieved in step 740, an activation signal is sent to the controller 240 for activating the motor 248 (or a similar such motor) to transfer the coupon exchange coupon to the coupon invalidator and collector 252. Upon receiving the coupon exchange coupon 40 the coupon invalidator and collector 252 voids the coupon, preferably by inking over the coupon's bar code, and subsequently stores the coupon as verification of redemption. Following the activation of step 740, in steps 744–752, the redeemed coupon data storage 220 is updated by the processor 212 to reflect the redemption value of the coupon exchange coupon 40 input. Thus, in step 744 a field having the total redemption amount for the product identified by the coupon exchange coupon 40 input is incremented by the redemption value of the coupon.

In step 748 a field corresponding to the total cash value of the coupon redemption check to be written to the consumer is updated by the same amount and in step 752 the total number of coupon exchanger coupons 40 redeemed for the product identified by the input coupon exchange coupon 40 is incremented.

Subsequently, in the remaining steps 756–768 of the program of FIG. 10, a determination is made as to whether or how many "bonus points" are to be allocated to the consumer. In this regard, it is a noteworthy aspect of the present invention to allow consumers to accumulate bonus points in a bonus point account whereby the bonus points can be exchanged for items from a predetermined selection of items. Of course, to accomplish this the consumer must be identified. Therefore, in step 756 a determination is made as to whether a consumer identification card 268 has been inserted into the consumer identification unit 264. If such is the case, then in step 760 a determination is made as to whether the consumer identification data read from the identification card 268 matches any consumer identification data on the input coupon exchange coupon 40. If the test in step 760 is affirmative, then steps 764 and 768 determine the number of bonus points to be credited to the consumer and these points are added to a consumer record within the redeemed coupon data storage 220.

In FIG. 11, a flowchart is presented of the process spawned in FIG. 8 to handle a check writing event record created in step 632. More precisely, the flowchart of FIG. 11 both shows the writing of one or more checks 48 and subsequently the sending of data to the coupon exchanger 32 regarding the just completed consumer transaction at the sales checkout station 52.

Continuing now with a description of the steps in FIG. 11, in step 800 a determination is made as to whether the total amount of the redeemed coupon exchange coupons 40 is greater than 0. If not, then nothing more is to be done since in the present embodiment of the invention no checks 48 are written to the consumer. Otherwise, in step 804 the processor 212 activates the check writer 260 to write a check 48 for the total amount of the redeemed coupon exchange coupons 40. As an aside, note that, in an alternative embodiment to step 804, the consumer can have the total amount of the redeemed coupon exchange coupons 40 credited to an account; e.g., to a debit account which the consumer has established with the retail sales store 24. Subsequently, in step 808 a determination is made as to the amount(s) of any bonus and/or promotional check(s) to be issued. Note that each promotional check typically is only redeemable for merchandize or services at a local business. Thus, for example, a promotional check may be issued for $5.00 off the cost of a meal at a local restaurant. In step 812, a determination is made as to whether a promotional check and/or a bonus check is to be written. Note that in determining whether a bonus check is to be written, a random number generator is used. That is, the random number generator can be used to determine whether a bonus check is to be written and/or the amount of the bonus check. Subsequently, if either type of check 48 is to be written, then in step 816 the check writer 260 is activated to write one or more checks corresponding to the non-zero promotional and/or non-zero bonus amounts. Following this, in step 820 data regarding the current consumer transaction is sent to the coupon exchanger 32. In particular, the following data is sent to the coupon exchanger 32: any consumer identification data, the total value of all coupon exchange coupons 40 redeemed during the transaction, the amount of any bonus points allotted to the consumer, the value of the coupon exchange coupons 40 redeemed per product, the number of coupon exchange coupons 40 redeemed per product and the cash value of any bonus check 48 written. Subsequently, since no further data specific to this consumer transaction needs to be retained in the coupon scanning check writer 200, in step 824 the accumulation fields of the redeemed coupon data storage 220 and the consumer transaction data storage 228 are reset or invalidated in preparation for use with the next consumer.

In an alternative embodiment of the present invention, the coupon scanning check writer 44 is used to redeem coupons provided to consumers by a means other than the coupon exchanger 32. For example, by conducting direct marketing surveys, consumers can be identified that are likely to purchase a particular product in the near future. By mailing or otherwise presenting such consumers with a coupon exchange coupon 40 for a competitor's comparable product which is redeemable for a check using the coupon scanning check writer 44, the consumer may be enticed into purchasing the competitor's products. For instance, in purchasing an automobile, one manufacturer may mail coupon exchange coupons 40 to consumers contemplating purchasing an automobile of another manufacturer in order to entice consumers into purchasing an automobile from the manufacturer providing the coupon exchange coupons 40. Note that a similar technique can also be applied to other business areas such as purchasing airline tickets. In each case, the coupon scanning check writer 44 provides the benefits of: (a) allowing a retailer of the product or service to redeem the coupon exchange coupons 40 without using the retailer's funds; (b) inhibiting coupon fraud since the coupon exchange coupons 40 are automatically invalidated upon redemption; and (c) supplying consumers with an immediate cash rebate for purchasing a promoted product.

Further, since the coupon exchange coupons 32 can be encoded such that they are valid for only predetermined business locations, a manufacturer or service provider can easily limit the exchange of coupon exchange coupons 40 to, for example, retail outlets in a particular geographical region.

The foregoing discussion of the invention has been presented for purposes of illustration and description. Further, the description is not intended to limit the invention to the form disclosed herein. Subsequently, variation and modification commiserate with the above teachings, within the skill and knowledge of the relevant art, are within the scope of the present invention. The embodiment described hereinabove is further intended to explain the best mode presently known of practicing the invention and to enable others skilled in the art to utilize the invention as presented, or in other embodiments, and with the various modifications required by their particular application or uses of the invention. It is intended that the appended claims be construed to include alternative embodiments to the extent permitted by the prior art.

What is claimed is:

1. A method related to coupons, comprising:

providing at least a first conventional coupon that includes product information related to a first product;

inputting said first conventional coupon to an apparatus used in outputting at least one exchange coupon;

controlling whether an exchange coupon should be outputted by said apparatus using said inputted first conventional coupon;

outputting by said apparatus at least a first exchange coupon that includes product information related to a second product, different from said first product, said apparatus being responsive to receiving said first conventional coupon wherein outputting of said first exchange coupon depends upon at least receipt of said first conventional coupon;

purchasing said second product;

ascertaining that said second product was purchased;

redeeming, after said outputting step, said first exchange coupon and not redeeming said first conventional coupon based on said step of purchasing said second product.

2. A method, as claimed in claim 1, wherein:

said inputting step includes receiving identification information to be associated with said first exchange coupon.

3. A method, as claimed in claim 1, wherein;

said controlling step includes determining whether an exchange coupon is being inputted to said apparatus.

4. A method, as claimed in claim 3, wherein:

said controlling step includes not generating any exchange coupon when an exchange coupon is inputted to said apparatus.

5. A method, as claimed in claim 1, wherein:

said controlling step includes rendering said first conventional coupon unredeemable.

6. A method, as claimed in claim 1, wherein:

said controlling step includes checking whether magnetic ink is provided on any item inputted to said apparatus.

7. A method, as claimed in claim 1, wherein:

said controlling step includes printing said second product information on said first exchange coupon.

8. A method, as claimed in claim 1, wherein:

said controlling step includes printing said second product information on said first exchange coupon with said second product information being determined independently of said first product information on said first conventional coupon.

9. A method, as claimed in claim 1, further comprising:

receiving cash for said first exchange coupon.

10. A method, as claimed in claim 9, wherein:

said receiving step includes printing a check including an amount corresponding to a rebate associated with said first exchange coupon.

11. A method for redeeming coupons, comprising:

providing a first coupon having first product information said first coupon including differentiation means for distinguishing said first coupon from conventional coupons that are used in obtaining discounts on purchased products;

purchasing said first product from a seller thereof, the seller having a check writer system;

inputting said first coupon to said check writer system;

reading said first product information using said check writer system;

determining whether a check for an amount should be written using said inputted first coupon, said determining step including ascertaining whether said first product was purchased from the seller; and printing a check using said check writer system for an amount based on said first product information, said check identifying a payor different from the seller of said first product.

12. A method, as claimed in claim 11, wherein:

said reading step includes scanning a bar code contained on said first coupon.

13. A method, as claimed in claim 11, wherein:

said determining step includes checking whether said first coupon is expired.

14. A method, as claimed in claim 11, wherein:

said determining step includes comparing said first product information with stored information.

15. A method, as claimed in claim 14, further including:

inhibiting said printing step when a lack of comparison is present between said first product information and said stored information.

16. A method, as claimed in claim 14, wherein:

said determining step includes keeping track of an amount when said comparing step results in a correspondence between said first product information and said stored information.

17. A method, as claimed in claim 11, wherein:

said inputting step includes providing a second coupon having second product information before said printing step.

18. A method, as claimed in claim 17, wherein:

said determining step includes checking for completion of a transaction related to said first and second coupons.

19. A method, as claimed in claim 18, wherein:

said printing step includes producing a check for a total amount using said first and second product information.

20. A method, as claimed in claim 11, further comprising:

rendering said first coupon unacceptable for further redemption.

21. A system for generating and redeeming exchange coupons, comprising:

first means for receiving a first coupons, said first means including means for ascertaining whether said first coupon is an exchange coupon;

second means responsive to said first means for generating a first exchange coupon having first product information related to a first product, said first exchange coupon including means for differentiating said first exchange coupon from a coupon that is not an exchange coupon, said first exchange coupon not being generated by said second means when said first means receives an exchange coupon, with said second means outputting said first exchange coupon in response to ascertaining that at least said first coupon was received by said first means, wherein said outputting of said first exchange coupon is dependent on said first coupon being received by said first means;

third means for reading said first product information from said first exchange coupon; and fourth means responsive to said third means for redeeming said first exchange coupon but not redeeming said first coupon based on said first exchange coupon product information.

22. A system, as claimed in claim 21, wherein:

said first means includes means for rendering said first coupon unredeemable.

23. A system, as claimed in claim 21, wherein:

said means for ascertaining includes means for checking for a type of ink.

24. A system, as claimed in claim 21, wherein:

said first means includes slot means of a size for receiving substantially any one of different sizes of coupons including said first exchange coupon.

25. A system, as claimed in claim 21, wherein:

said first means includes means for reading product-related information from said first coupon.

26. A system, as claimed in claim 21, wherein:

said second means includes memory means for storing a plurality of information related to a number of different products, with one of said plurality of information being selectable for generating said first exchange coupon.

27. A system, as claimed in claim 26, wherein:

said second means includes computer means for selecting product information in a sequential manner.

28. A system, as claimed in claim 27, wherein:

said second means includes modem means for use in providing communication between said computer means and product information source means for updating said memory means.

29. A system, as claimed in claim 21, wherein:

said fourth means includes means for reading said first product information associated with said first exchange coupon.

30. A system, as claimed in claim 21, wherein:

said fourth means includes means for comparing said first product information associated with said first exchange coupon with stored information and means for printing a check that includes an amount that is based on said first product information.

31. A system, as claimed in claim 21, wherein:

said second means includes means for rendering said first coupon unredeemable before said first coupon is able to be redeemed by purchasing a product identified on said first coupon and said fourth means includes means for rendering said first exchange coupon unacceptable for further redemption after said first exchange coupon has been redeemed using said first product information.

32. A system, as claimed in claim 21, wherein:

said first product information of said first exchange coupon includes:

a expiration information associated with redemption of said first exchange coupon, with said expiration being no greater than the day following the day on which said first exchange coupon was generated by said second means.

33. A system, as claimed in claim 30, wherein:

said means for printing prints a second check different from said first check but being printed at substantially the same time as said first check is printed, using random generator means.

34. A system, as claimed in claim 21, wherein:

said first means includes means for obtaining identification information from identification means that is different from said first coupon and said fourth means includes means for receiving identification information associated with said first exchange coupon, with said means for obtaining being different from said means for receiving and said identification information being obtained by said means for obtaining before said first exchange coupon is redeemed.

35. An apparatus for redeeming a coupon, comprising:

input means for receiving a first coupon having first product information;

scanning means for reading said first product information using said first coupon, said first product information being associated with a first product for purchasing from a seller and said first coupon including means, other than said first product information and expiration information, for indicating that said first coupon is acceptable for redemption and for determining that said first coupon is to be rejected when said means for indicating is not present;

comparing means responsive to said first product information for determining whether an amount should be generated; and printing means responsive to said comparing means for providing a check in an amount based on said first product information, and in which the payor of said check amount is different from the seller of said first product.

36. An apparatus as claimed in claim 35, wherein:

the payor of said check amount is identified on said check and is the supplier of said first coupon.

37. An apparatus, as claimed in claim 35, further including:

means for receiving identification means different from said first coupon that includes identification information associated with the payee of said check amount.

* * * * *